(12) United States Patent
Xia et al.

(10) Patent No.: US 7,974,340 B2
(45) Date of Patent: Jul. 5, 2011

(54) ADAPTIVE B-PICTURE QUANTIZATION CONTROL

(75) Inventors: Minghui Xia, Bellevue, WA (US); Chih-Lung Lin, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1406 days.

(21) Appl. No.: 11/400,744

(22) Filed: Apr. 7, 2006

(65) Prior Publication Data

US 2007/0237222 A1   Oct. 11, 2007

(51) Int. Cl.
*H04N 11/04* (2006.01)

(52) U.S. Cl. .............................. 375/240.03; 375/240.06

(58) Field of Classification Search ............. 375/240.03, 375/240.26
See application file for complete search history.

(56) References Cited

U.S. PATENT DOCUMENTS

| | | | |
|---|---|---|---|
| 4,583,114 A | 4/1986 | Catros | |
| 4,679,079 A | 7/1987 | Catros et al. | |
| 4,774,574 A | 9/1988 | Daly et al. | |
| 4,821,119 A | 4/1989 | Gharavi | |
| 4,862,264 A | 8/1989 | Wells et al. | |
| 4,965,830 A | 10/1990 | Barham et al. | |
| 4,992,889 A | 2/1991 | Yamagami et al. | |
| 5,072,295 A | 12/1991 | Murakami et al. | |
| 5,128,758 A | 7/1992 | Azadegan et al. | |
| 5,136,377 A | 8/1992 | Johnston et al. | |
| 5,144,426 A | 9/1992 | Tanaka et al. | |
| 5,179,442 A | 1/1993 | Azadegan et al. | |
| 5,237,410 A | 8/1993 | Inoue | |
| 5,241,395 A | 8/1993 | Chen | |
| 5,253,058 A | 10/1993 | Gharavi | |
| 5,301,242 A | 4/1994 | Gonzales et al. | |
| 5,303,058 A | 4/1994 | Fukuda et al. | |
| 5,317,396 A | 5/1994 | Fujinami | |
| 5,317,672 A | 5/1994 | Crossman et al. | |
| 5,333,212 A | 7/1994 | Ligtenberg | |
| 5,351,310 A | 9/1994 | Califano et al. | |
| 5,374,958 A | 12/1994 | Yanagihara | |
| 5,412,429 A | 5/1995 | Glover | |
| 5,452,104 A | 9/1995 | Lee | |
| 5,461,421 A | 10/1995 | Moon | |

(Continued)

FOREIGN PATENT DOCUMENTS

CA    1327074    2/1994

(Continued)

OTHER PUBLICATIONS

Puri et al., "Motion-Compensated Video Coding with Adaptive Perceptual Quantization," *IEEE Transactions on Circuits and Systems for Video Technology*, vol. 1, No. 4, pp. 351-361 (Dec. 1991).

(Continued)

*Primary Examiner* — Shuwang Liu
*Assistant Examiner* — Michael R Neff
(74) *Attorney, Agent, or Firm* — Klarquist Sparkman, LLP

(57) ABSTRACT

The present application is directed to techniques and tools for adapting the quantizer as well as the quantization step size used during video encoding. For example, a video encoder uses a non-uniform quantizer (having a relatively large dead zone ratio) for B-picture types, but uses a uniform quantizer for other types of pictures. In many encoding scenarios, this helps the encoder control bit rate for the B-picture types instead of resorting to higher quantization step sizes, which improves overall quality for the B-picture types.

16 Claims, 7 Drawing Sheets

U.S. PATENT DOCUMENTS

| | | |
|---|---|---|
| 5,473,377 A | 12/1995 | Kim |
| 5,481,553 A | 1/1996 | Suzuki et al. |
| 5,506,916 A | 4/1996 | Nishihara et al. |
| 5,510,785 A | 4/1996 | Segawa et al. |
| 5,537,493 A | 7/1996 | Wilkinson |
| 5,539,469 A | 7/1996 | Jung |
| 5,559,557 A | 9/1996 | Kato |
| 5,565,920 A | 10/1996 | Lee et al. |
| 5,587,708 A | 12/1996 | Chiu |
| 5,606,371 A | 2/1997 | Gunnewick et al. |
| 5,623,424 A | 4/1997 | Azadegan et al. |
| 5,631,644 A | 5/1997 | Katata et al. |
| 5,654,760 A | 8/1997 | Ohtsuki |
| 5,657,087 A | 8/1997 | Jeong et al. |
| 5,663,763 A | 9/1997 | Yagasaki et al. |
| 5,724,097 A | 3/1998 | Hibi et al. |
| 5,731,836 A | 3/1998 | Lee |
| 5,731,837 A | 3/1998 | Hurst, Jr. |
| 5,739,861 A | 4/1998 | Music |
| 5,751,358 A | 5/1998 | Suzuki et al. |
| 5,751,379 A | 5/1998 | Markandey et al. |
| 5,761,088 A | 6/1998 | Hulyalkar et al. |
| 5,764,803 A | 6/1998 | Jacquin et al. |
| 5,781,788 A | 7/1998 | Woo et al. |
| 5,786,856 A | 7/1998 | Hall et al. |
| 5,802,213 A | 9/1998 | Gardos |
| 5,809,178 A | 9/1998 | Anderson et al. |
| 5,815,097 A | 9/1998 | Schwartz et al. |
| 5,819,035 A | 10/1998 | Devaney et al. |
| 5,825,310 A | 10/1998 | Tsutsui |
| 5,835,145 A | 11/1998 | Ouyang et al. |
| 5,835,237 A | 11/1998 | Ebrahimi |
| 5,844,613 A | 12/1998 | Chaddha |
| 5,850,482 A | 12/1998 | Meany et al. |
| 5,867,167 A | 2/1999 | Deering |
| 5,870,435 A | 2/1999 | Choi et al. |
| 5,880,775 A | 3/1999 | Ross |
| 5,883,672 A | 3/1999 | Suzuki et al. |
| 5,926,791 A | 7/1999 | Ogata et al. |
| 5,969,764 A | 10/1999 | Sun et al. |
| 5,970,173 A | 10/1999 | Lee et al. |
| 5,990,957 A | 11/1999 | Ryoo |
| 6,044,115 A | 3/2000 | Horiike et al. |
| 6,049,630 A | 4/2000 | Wang et al. |
| 6,058,362 A | 5/2000 | Malvar |
| 6,072,831 A | 6/2000 | Chen |
| 6,084,636 A | 7/2000 | Fujiwara |
| 6,088,392 A | 7/2000 | Rosenberg |
| 6,091,777 A | 7/2000 | Guetz et al. |
| 6,104,751 A | 8/2000 | Artieri |
| 6,118,817 A | 9/2000 | Wang |
| 6,118,903 A | 9/2000 | Liu |
| 6,125,140 A | 9/2000 | Wilkinson |
| 6,148,107 A | 11/2000 | Ducloux et al. |
| 6,148,109 A | 11/2000 | Boon et al. |
| 6,160,846 A | 12/2000 | Chiang et al. |
| 6,167,091 A | 12/2000 | Okada et al. |
| 6,182,034 B1 | 1/2001 | Malvar |
| 6,212,232 B1 | 4/2001 | Reed et al. |
| 6,215,905 B1 | 4/2001 | Lee et al. |
| 6,223,162 B1 | 4/2001 | Chen et al. |
| 6,240,135 B1 | 5/2001 | Kim |
| 6,240,380 B1 | 5/2001 | Malvar |
| 6,243,497 B1 | 6/2001 | Chiang et al. |
| 6,249,614 B1 | 6/2001 | Bocharova et al. |
| 6,256,422 B1 | 7/2001 | Mitchell et al. |
| 6,256,423 B1 | 7/2001 | Krishnamurthy |
| 6,263,022 B1 | 7/2001 | Chen et al. |
| 6,263,024 B1 | 7/2001 | Matsumoto |
| 6,275,614 B1 | 8/2001 | Krishnamurthy et al. |
| 6,278,735 B1 | 8/2001 | Mohsenian |
| 6,292,588 B1 | 9/2001 | Shen et al. |
| 6,314,208 B1 | 11/2001 | Konstantinides et al. |
| 6,337,881 B1 | 1/2002 | Chaddha |
| 6,347,116 B1 | 2/2002 | Haskell et al. |
| 6,348,945 B1 | 2/2002 | Hayakawa |
| 6,356,709 B1 | 3/2002 | Abe et al. |
| 6,359,928 B1 | 3/2002 | Wang et al. |
| 6,360,017 B1 | 3/2002 | Chiu et al. |
| 6,370,502 B1 | 4/2002 | Wu et al. |
| 6,389,171 B1 | 5/2002 | Washington |
| 6,393,155 B1 | 5/2002 | Bright et al. |
| 6,408,026 B1 | 6/2002 | Tao |
| 6,418,166 B1 | 7/2002 | Wu et al. |
| 6,438,167 B1 | 8/2002 | Shimizu et al. |
| 6,456,744 B1 | 9/2002 | Lafe |
| 6,463,100 B1 | 10/2002 | Cho et al. |
| 6,466,620 B1 | 10/2002 | Lee |
| 6,473,534 B1 | 10/2002 | Merhav et al. |
| 6,490,319 B1 | 12/2002 | Yang |
| 6,493,385 B1 | 12/2002 | Sekiguchi et al. |
| 6,519,284 B1 | 2/2003 | Pesquet-Popescu et al. |
| 6,526,096 B2 | 2/2003 | Lainema et al. |
| 6,546,049 B1 | 4/2003 | Lee |
| 6,571,019 B1 | 5/2003 | Kim et al. |
| 6,593,925 B1 | 7/2003 | Hakura et al. |
| 6,600,836 B1 | 7/2003 | Thyagarajan et al. |
| 6,647,152 B2 | 11/2003 | Willis et al. |
| 6,654,417 B1 | 11/2003 | Hui |
| 6,678,422 B1 | 1/2004 | Sharma et al. |
| 6,687,294 B2 | 2/2004 | Yan et al. |
| 6,704,718 B2 | 3/2004 | Burges et al. |
| 6,721,359 B1 | 4/2004 | Bist et al. |
| 6,728,317 B1 | 4/2004 | Demos |
| 6,731,811 B1 | 5/2004 | Rose |
| 6,738,423 B1 | 5/2004 | Lainema et al. |
| 6,747,660 B1 | 6/2004 | Olano et al. |
| 6,759,999 B1 | 7/2004 | Doyen |
| 6,760,482 B1 | 7/2004 | Taubman |
| 6,765,962 B1 | 7/2004 | Lee et al. |
| 6,771,830 B2 | 8/2004 | Goldstein et al. |
| 6,785,331 B1 | 8/2004 | Jozawa et al. |
| 6,788,740 B1 | 9/2004 | Van der Schaar et al. |
| 6,792,157 B1 | 9/2004 | Koshi et al. |
| 6,795,584 B2 | 9/2004 | Karczewicz et al. |
| 6,801,572 B2 | 10/2004 | Yamada et al. |
| 6,807,317 B2 | 10/2004 | Mathew et al. |
| 6,810,083 B2 | 10/2004 | Chen et al. |
| 6,831,947 B2 | 12/2004 | Ribas Corbera |
| 6,862,320 B1 | 3/2005 | Isu et al. |
| 6,865,291 B1 | 3/2005 | Zador |
| 6,873,654 B1 | 3/2005 | Rackett |
| 6,876,703 B2 | 4/2005 | Ismaeil et al. |
| 6,882,753 B2 | 4/2005 | Chen et al. |
| 6,907,142 B2 | 6/2005 | Kalevo et al. |
| 6,909,745 B1 | 6/2005 | Puri et al. |
| 6,947,045 B1 | 9/2005 | Ostermann et al. |
| 6,975,680 B2 | 12/2005 | Demos |
| 6,990,242 B2 | 1/2006 | Malvar |
| 7,016,546 B2 | 3/2006 | Fukuhara et al. |
| 7,020,204 B2 | 3/2006 | Auvray et al. |
| 7,027,507 B2 | 4/2006 | Wu |
| 7,035,473 B1 | 4/2006 | Zeng et al. |
| 7,042,941 B1 | 5/2006 | Laksono et al. |
| 7,058,127 B2 | 6/2006 | Lu et al. |
| 7,099,389 B1 | 8/2006 | Yu et al. |
| 7,110,455 B2 | 9/2006 | Wu et al. |
| 7,162,096 B1 | 1/2007 | Horowitz |
| 7,200,277 B2 | 4/2007 | Joshi et al. |
| 7,301,999 B2 * | 11/2007 | Filippini et al. ......... 375/240.03 |
| 7,356,085 B2 | 4/2008 | Gavrilescu et al. |
| 7,463,780 B2 | 12/2008 | Fukuhara et al. |
| 7,471,830 B2 | 12/2008 | Lim et al. |
| 2001/0048718 A1 | 12/2001 | Bruls et al. |
| 2002/0044602 A1 | 4/2002 | Ohki |
| 2002/0118884 A1 | 8/2002 | Cho et al. |
| 2002/0136308 A1 | 9/2002 | Le Maguet et al. |
| 2002/0154693 A1 | 10/2002 | Demos et al. |
| 2002/0186890 A1 | 12/2002 | Lee et al. |
| 2003/0021482 A1 | 1/2003 | Lan et al. |
| 2003/0053702 A1 | 3/2003 | Hu |
| 2003/0095599 A1 | 5/2003 | Lee et al. |
| 2003/0103677 A1 | 6/2003 | Tastl et al. |
| 2003/0108100 A1 | 6/2003 | Sekiguchi et al. |
| 2003/0113026 A1 | 6/2003 | Srinivasan et al. |
| 2003/0128754 A1 | 7/2003 | Akimoto et al. |
| 2003/0128756 A1 | 7/2003 | Oktem |

| | | |
|---|---|---|
| 2003/0185420 A1 | 10/2003 | Sefcik et al. |
| 2003/0194010 A1 | 10/2003 | Srinivasan et al. |
| 2003/0215011 A1 | 11/2003 | Wang et al. |
| 2003/0219073 A1 | 11/2003 | Lee et al. |
| 2004/0008901 A1 | 1/2004 | Avinash |
| 2004/0022316 A1 | 2/2004 | Ueda et al. |
| 2004/0036692 A1 | 2/2004 | Alcorn et al. |
| 2004/0090397 A1 | 5/2004 | Doyen et al. |
| 2004/0151243 A1 | 8/2004 | Bhaskaran et al. |
| 2004/0158719 A1 | 8/2004 | Lee et al. |
| 2004/0190610 A1 | 9/2004 | Song et al. |
| 2004/0202376 A1 | 10/2004 | Schwartz et al. |
| 2004/0228406 A1 | 11/2004 | Song |
| 2004/0264568 A1 | 12/2004 | Florencio |
| 2004/0264580 A1 | 12/2004 | Chiang Wei Yin et al. |
| 2005/0002575 A1 | 1/2005 | Joshi et al. |
| 2005/0008075 A1 | 1/2005 | Chang et al. |
| 2005/0013365 A1 | 1/2005 | Mukerjee et al. |
| 2005/0013497 A1 | 1/2005 | Hsu et al. |
| 2005/0013498 A1 | 1/2005 | Srinivasan et al. |
| 2005/0013500 A1 | 1/2005 | Lee et al. |
| 2005/0015246 A1 | 1/2005 | Thumpudi et al. |
| 2005/0015259 A1 | 1/2005 | Thumpudi et al. |
| 2005/0024487 A1 | 2/2005 | Chen |
| 2005/0031034 A1* | 2/2005 | Kamaci et al. ........... 375/240.03 |
| 2005/0036698 A1 | 2/2005 | Beom |
| 2005/0036699 A1* | 2/2005 | Holcomb et al. ............. 382/239 |
| 2005/0041738 A1 | 2/2005 | Lin et al. |
| 2005/0052294 A1 | 3/2005 | Liang et al. |
| 2005/0053151 A1 | 3/2005 | Lin et al. |
| 2005/0053158 A1 | 3/2005 | Regunathan et al. |
| 2005/0094731 A1 | 5/2005 | Xu et al. |
| 2005/0105612 A1 | 5/2005 | Sung et al. |
| 2005/0123274 A1 | 6/2005 | Crinon et al. |
| 2005/0135484 A1 | 6/2005 | Lee et al. |
| 2005/0147163 A1 | 7/2005 | Li et al. |
| 2005/0152451 A1 | 7/2005 | Byun |
| 2005/0180500 A1 | 8/2005 | Chiang et al. |
| 2005/0180502 A1 | 8/2005 | Puri |
| 2005/0190836 A1 | 9/2005 | Lu et al. |
| 2005/0207492 A1 | 9/2005 | Pao |
| 2005/0232501 A1 | 10/2005 | Mukerjee |
| 2005/0254719 A1 | 11/2005 | Sullivan |
| 2005/0259729 A1 | 11/2005 | Sun |
| 2005/0276493 A1 | 12/2005 | Xin et al. |
| 2006/0013307 A1 | 1/2006 | Olivier et al. |
| 2006/0013309 A1 | 1/2006 | Ha et al. |
| 2006/0018552 A1 | 1/2006 | Malayath et al. |
| 2006/0034368 A1 | 2/2006 | Klivington |
| 2006/0038826 A1 | 2/2006 | Daly |
| 2006/0071825 A1 | 4/2006 | Demos |
| 2006/0104527 A1 | 5/2006 | Koto et al. |
| 2006/0133478 A1 | 6/2006 | Wen |
| 2006/0140267 A1 | 6/2006 | He et al. |
| 2006/0197777 A1 | 9/2006 | Cha et al. |
| 2006/0227868 A1 | 10/2006 | Chen et al. |
| 2006/0238444 A1 | 10/2006 | Wang et al. |
| 2006/0239576 A1 | 10/2006 | Mukherjee |
| 2006/0256851 A1 | 11/2006 | Wang et al. |
| 2006/0256867 A1 | 11/2006 | Turaga et al. |
| 2006/0268990 A1 | 11/2006 | Lin et al. |
| 2007/0009039 A1 | 1/2007 | Ryu |
| 2007/0009042 A1 | 1/2007 | Craig et al. |
| 2007/0081588 A1 | 4/2007 | Raveendran et al. |
| 2007/0147497 A1 | 6/2007 | Bao et al. |
| 2007/0201553 A1 | 8/2007 | Shindo |
| 2007/0237221 A1 | 10/2007 | Hsu et al. |
| 2007/0237236 A1 | 10/2007 | Chang et al. |
| 2007/0237237 A1 | 10/2007 | Chang et al. |
| 2007/0248163 A1 | 10/2007 | Zuo et al. |
| 2007/0248164 A1 | 10/2007 | Zuo et al. |
| 2007/0258518 A1 | 11/2007 | Tu et al. |
| 2007/0258519 A1 | 11/2007 | Srinivasan |
| 2008/0089410 A1 | 4/2008 | Lu et al. |
| 2008/0192822 A1 | 8/2008 | Chang et al. |
| 2008/0240235 A1 | 10/2008 | Holcomb et al. |
| 2008/0240250 A1 | 10/2008 | Lin et al. |
| 2008/0240257 A1 | 10/2008 | Chang et al. |
| 2008/0260278 A1 | 10/2008 | Zuo et al. |
| 2008/0304562 A1 | 12/2008 | Chang et al. |
| 2009/0213930 A1 | 8/2009 | Ye et al. |
| 2009/0245587 A1 | 10/2009 | Holcomb et al. |
| 2009/0296808 A1 | 12/2009 | Regunathan et al. |
| 2010/0177826 A1 | 7/2010 | Bhaumik et al. |

FOREIGN PATENT DOCUMENTS

| | | |
|---|---|---|
| EP | 0932306 | 7/1999 |
| EP | 1465349 | 10/2004 |
| EP | 1871113 | 12/2007 |
| GB | 897363 | 5/1962 |
| JP | 2003061090 | 2/2003 |
| JP | 6-296275 | 10/2004 |
| KR | 132895 | 10/1998 |
| WO | WO 97/21302 | 6/1997 |
| WO | WO 99/48300 | 9/1999 |
| WO | WO 00/21207 | 4/2000 |
| WO | WO 00/72599 | 11/2000 |
| WO | WO 02/07438 | 1/2002 |
| WO | WO 2004/100554 | 11/2004 |
| WO | WO 2004/100556 | 11/2004 |
| WO | WO 2005/065030 | 7/2005 |
| WO | WO 2006/075895 | 7/2006 |
| WO | WO 2006/112620 | 10/2006 |
| WO | WO 2007/130580 | 11/2007 |

OTHER PUBLICATIONS

Tsang et al., "Fuzzy Based Rate Control for Real-Time MPEG Video," *IEEE Transactions on Fuzzy Systems*, pp. 504-516 (1998).

U.S. Appl. No. 10/846,140, filed May 15, 2004, Sullivan.

Atzori et al., "Adaptive Anisotropic Filtering (AAF) for Real-Time Visual Enhancement of MPEG-Coded Video Sequences," *IEEE Transactions on Circuits and Systems for Video Technology*, vol. 12, No. 5, pp. 285-298 (May 2002).

Augustine et al., "Region of Interest Editing of MPEG-2 Video Streams in the Compressed Domain," *2004 IEEE Int'l Conf. on Multimedia and Expo: ICME'04*, vol. 1, Issue 27-30, pp. 559-562 (Jun. 2004).

Bist et al., "Adaptive Quantization for Low Bit Rate Video Coding," *Proc. 1998 Int'l Conf. on Image Processing (ICIP 98)*, pp. 925-928 (Oct. 1998).

Chang et al., "Adaptive Wavelet Thresholding for Image Denoising and Compression," *IEEE Trans on Image Processing*, vol. 9, No. 9, pp. 1532-1546 (Sep. 2000).

Chrysafis et al., "Context-based Adaptive Image Coding," *Proc. of the 30th Asilomar Conf. on Signals, Systems, and Computers*, 5 pp. (Nov. 1996).

De Simone, et al., "A comparative study of JPEG 2000, AVC/H.264, and HD Photo," *SPIE Optics and Photonics, Applications of Digital Image Processing XXX*, 12 pp. (Aug. 2007).

Farvardin et al., "Optimum quantizer performance for a class of non-Gaussian memoryless sources," *IEEE Trans. Inform. Theory*, vol. IT-30, No. 3, pp. 485-497 (May 1984).

Flierl et al., "A Video Codec Incorporating Block-Based Multi-Hypothesis Motion-Compensated Prediction," in *Proceedings of the SPIE Conference on Visual Communications and Image Processing*, Perth, Australia, vol. 4067, pp. 238-249 (Jun. 2000).

Flierl et al., "Generalized B Pictures and the Draft H.264/AVC Video Compression Standard," in *IEEE Transactions on Circuits and Systems for Video Technology*, vol. 13, No. 7, pp. 587-597 (Jul. 2003).

Foos et al., "JPEG 2000 compression of medical imagery," *Proc. SPIE*, vol. 3980, pp. 85-96 (Feb. 2000).

Garrigues et al., "Atom position coding in a matching pursuit based video coder," *Lecture Notes in Computer Science*, 4 pp. (Sep. 2005).

Gavrilescu et al., "Embedded Multiple Description Scalar Quantizers," *IEE Electronics Letters*, vol. 39, No. 13, 12 pp. (Jun. 2003).

Gish et al., "Asymptotically efficient quantizing," *IEEE Trans. Inform. Theory*, vol. IT-14, No. 5 (Sep. 1968).

Golner et al., "Region Based Variable Quantization for JPEG Image Compression," *IEEE Symp. on Circuits and Systems*, pp. 604-607 (Aug. 2000).

Golston et al., "Video codecs tutorial: Trade-offs with H.264, VC-1 and other advanced codecs," *Video/Imaging Design Line*, 9 pp. (Mar. 2006).

"H.264 & IPTV Over DSL—Enabling New Telco Revenue Opportunities," *White Paper*, 12 pp. (May 15, 2004).

Hannuksela et al., "Sub-picture: ROI coding and unequal error protection," Proc. 2002 Int'l Conf. on Image Processing, vol. 3, Issue 24-28, pp. 537-540 (Jun. 2002).

"ISO/IEC 11172-2 Coding of moving pictures and associated audio for digital storage media at up to about 1.5 Mbit/s," MPEG (Moving Pictures Expert Group), International Organization for Standardization, MPEG1 Video, 122 pp. (Aug. 1993).

"ISO/IEC 13818-2. Generic coding of moving pictures and associated audio information," MPEG (Moving Pictures Expert Group), International Organization for Standardization, MPEG2 Video, 23 pp. (Dec. 2000).

ISO/IEC, "Information Technology—Coding of Audio-Visual Objects: Visual, ISO/IEC 14496-2, Committee Draft," 330 pp. (Mar. 1998).

ISO/IEC, "14496-2: Information Technology—Coding of Audio-Visual Objects—Part 2: Visual," 724 pp. (Jun. 2004).

ITU-T, "ITU-T Recommendation H.261: Video Codec for Audiovisual Services at $p$ x 64 kbits," 28 pp. (Mar. 1993).

ITU-T, "ITU-T Recommendation H.262: Information Technology—Generic Coding of Moving Pictures and Associated Audio Information: Video," 218 pp. (Jul. 1995).

ITU-T, "ITU-T Recommendation H.263: Video Coding for Low Bit Rate Communication," 167 pp. (Feb. 1998).

Joint Video Team (JVT) of ISO/IEC MPEG & ITU-T VCEG, "Draft ITU-T Recommendation and Final Draft International Standard of Joint Video Specification (ITU-T Rec. H.264 ISO/IEC 14496-10 AVC," 253 pp. (May 2003).

Joshi et al., "Comparison of generalized Gaussian and Laplacian modeling in DCT image coding," *IEEE Signal Proc. Letters*, vol. SPL-2, No. 5, pp. 81-82 (May 1995).

Kim et al., "Still image coding based on vector quantization and fractal approximation," *IEEE Transactions on Image Processing*, vol. 5, No. 4, pp. 587-597 (Apr. 1996).

Kopp, "Lossless Wavelet Based Image Compression with Adaptive 2D Decomposition," *Proc. 4th Int'l Conf. in Central Europe on Computer Graphics and Visualization 96*, pp. 141-149 (Feb. 12-16, 1996).

Lam et al., "A mathematical analysis of the DCT coefficient distributions for images," *IEEE Trans. Image Proc.*, vol. IP-9, No. 10, pp. 1661-1666 (Oct. 2000).

LeGall, "MPEG: A Video Compression Standard for Multimedia Application," *Communications of the ACM*, vol. 34, No. 4, pp. 47-58 (Apr. 1991).

LeGall, "The MPEG Video Compression Algorithm," *Signal Processing: Image Communication 4*, vol. 4, No. 2, pp. 129-140 (Apr. 1992).

LeGall et al., "Transmission of HDTV signals under 140 Mbit/s using a subband decomposition and Discrete Cosine Transform coding," in *Signal Processing of HDTV*, Elsevier, Amsterdam, pp. 287-293 (Oct. 1988).

Lei et al., "Rate Adaptation Transcoding for Precoded Video Streams," 13 pp. (month unknown, 2000).

Limb, "A Picture-Coding Algorithm for the Merli Scan," *IEEE Transactions on Communications*, pp. 300-305 (Apr. 1973).

Lin et al, "Low-complexity face-assisted coding scheme for low bit rate video telephony," *IEICE Trans. Inf. & Sys.*, vol. E86-D, No. 1, pp. 101-108 (Jan. 2003).

Lin et al, "Low-complexity face-assisted video coding," *Proc. 2000 Int'l Conf. on Image Processing*, vol. 2, pp. 207-210 (Sep. 2000).

Lloyd, "Least squares quantization in PCM," *IEEE Trans. Inform. Theory*, vol. IT-28, No. 2, pp. 7-12 (Mar. 1982) (reprint of work originally presented in Jul. 1957).

Loomis, "Using the Advanced Settings of the Windows Media Video 9 Advanced Profile Codec," 13 pp. (Document dated Apr. 2006) [Downloaded from the World Wide Web on May 31, 2007].

Lopresto et al., "Image Coding Based on Mixture Modeling of Wavelet Coefficients and a Fast Estimation-Quantization Framework," *Proc. IEEE Data Compression Conference*, (Snowbird, UT), pp. 221-230 (Mar. 1997).

Luo et al., "A Scene Adaptive and Signal Adaptive Quantization for Subband Image and Video Compression Using Wavelets," *IEEE Trans. on Circuits and Systems for Video Tech.*, vol. 7, No. 2, pp. 343-357 (Apr. 1997).

Mallat, "A theory for multiresolution signal decomposition: the wavelet representation," *IEEE Trans. Pattern Anal. and Machine Intell.*, vol. PAMI-11, No. 7, pp. 674-692 (Jul. 1989).

Masala et al., "Perceptually Optimized MPEG Compression of Synthetic Video Sequences," *Proc. ICIP*, pp. I-601-I-604 (Sep. 2005).

Max, "Quantizing for minimum distortion," *IEEE Trans. Inform. Theory*, vol. IT-6, No. 1, pp. 7-12 (Mar. 1960).

Microsoft Corporation, "Microsoft Debuts New Windows Media Player 9 Series, Redefining Digital Media on the PC," 4 pp. (Sep. 4, 2002) [Downloaded from the World Wide Web on May 14, 2004].

Mitra et al., "Two-Stage Color Palettization for Error Diffusion," *Proceedings of SPIE*, pp. 207-217 (Jun. 2002).

Mook, "Next-Gen Windows Media Player Leaks to the Web," *BetaNews*, 17 pp. (Jul. 19, 2002) [Downloaded from the World Wide Web on Aug. 8, 2003].

Muller, "Distribution shape of two-dimensional DCT coefficients of natural images," *IEE Electronics Letters*, vol. 29, No. 22 (Oct. 1993).

Murakami et al., "Comparison between DPCM and Hadamard transform coding in the composite coding of the NTSC color TV signal," *IEEE Trans. on Commun.*, vol. COM-30, No. 3, pp. 469-479 (Mar. 1982).

Musmann et al., "Advances in Picture Coding," *Proceedings of the IEEE*, vol. 73, No. 4, pp. 523-548 (Apr. 1985).

Neff et al., "Modulus Quantization for Matching Pursuit Video Coding," *IEEE Transactions on Circuits and Systems for Video Technology*, vol. 10, No. 6, pp. 895-912 (Sep. 2000).

Nguyen et al., "Set Theoretic Compression with an Application to Image Coding," *IEEE Transactions on Image Processing*, vol. 7, No. 7, pp. 1051-1056 (Jul. 1998).

Park et al., "A post processing method for reducing quantization effects in low bit-rate moving picture coding," *IEEE Trans. Circuits Syst. Video Technology*, vol. 9, pp. 161-171 (Feb. 1999).

Radha et al., "The MPEG-4 Fine-Grained Scalable Video Coding Method for Multimedia Streaming Over IP," *IEEE Trans. on Multimedia*, vol. 3, No. 1, pp. 53-68 (Mar. 2001).

Reininger et al., "Distribution of two-dimensional DCT coefficients for images," *IEEE Trans. on Commun.*, vol. COM-31, No. 6, pp. 835-839 (Jun. 1983).

Ribas Corbera et al., "Rate Control in DCT Video Coding for Low-Delay Communications," *IEEE Transactions on Circuits and Systems for Video Technology*, vol. 9, No. 1, pp. 172-185 (Feb. 1999).

Schallauer et al., "PRESTO—Preservation Technologies for European Broadcast Archives, D5.4—High Quality Compression for Film and Video," 80 pp. (Sep. 18, 2002).

Schuster et al., "A Theory for the Optimal Bit Allocation Between Displacement Vector Field and Displaced Frame Difference," *IEEE J. on Selected Areas in Comm.*, vol. 15, No. 9, pp. 1739-1751 (Dec. 1997).

Shen et al., "Rate-Distortion Optimization for Fast Hierarchical B-Picture Transcoding," *IEEE*, pp. 5279-5282 (May 2006).

Shoushun et al., "Adaptive-Quantization Digital Image Sensor for Low-Power Image Compression," in *IEEE Transactions on Circuits and Systems—I: Regular Papers*, vol. 54, No. 1, pp. 13-25 (Jan. 2007).

Sony Electronics Inc., "Sony Vizaro DVD Encoder System DVA-V700," 4 pp. (Apr. 2001).

Sullivan, "Efficient scalar quantization of exponential and Laplacian random variables," *IEEE Trans. Inform. Theory*, vol. IT-42, No. 5, pp. 1365-1374 (Sep. 1996).

Sullivan et al., "Rate-Distortion Optimization for Video Compression," *IEEE Signal Processing Magazine*, pp. 74-90 (Nov. 1998).

Sullivan et al., "The H.264/AVC Advanced Video Coding Standard: Overview and Introduction to the Fidelity Range Extensions," 21 pp. (Aug. 2004).

Tao et al., "Adaptive Model-driven Bit Allocation for MPEG Video Coding," *IEEE Transactions on Circuits and Systems for Video Tech.*, vol. 10, No. 1, pp. 147-157 (Feb. 2000).

Wang, et al., "A Framework for Adaptive Scalable Video Coding Using Wyner-Ziv Techniques," *EURASIP Journal on Applied Signal Processing*, pp. 1-18 (month unknown, 2006).

Watson et al., "Visibility of Wavelet Quantization Noise," *IEEE Trans. on Image Processing*, vol. 6, No. 8, pp. 1164-1175 (Aug. 1997).

Wien, "Variable Block-Size Transforms for Hybrid Video Coding," Dissertation, 182 pp. (Feb. 2004).

Wu et al., "Context-Based, Adaptive, Lossless Image Coding," *IEEE Trans. Communications*, vol. 45, pp. 437-444 (Apr. 1997).

Wu et al., "Joint Estimation of Forward and Backward Motion Vectors for Interpolative Prediction of Video," *IEEE Transactions on Image Processing*, vol. 3, No. 5, pp. 684-687 (Sep. 1994).

Xiong et al., "Wavelet Packet Image Coding Using Space-Frequency Quantization," *IEEE Transactions on Image Processing*, vol. 7, No. 6, pp. 892-898 (Jun. 1998).

Yang et al., "Rate Control for Videophone Using Local Perceptual Cues," *IEEE Transactions on Circuits and Systems for Video Tech.*, vol. 15, No. 4, pp. 496-507 (Apr. 2005).

Yuen et al., "A survey of hybrid MC/DPCM/DCT video coding distortions," *Signal Processing*, vol. 70, pp. 247-278 (Nov. 1998).

Zaid et al., "Wavelet Image Coding with Adaptive Thresholding," 4 pp. (Jul. 2002).

Zhang et al., "Adaptive Field/Frame Selection for High Compression Coding," *SPIE Conf. on Image and Video Communications and Processing*, 13 pp. (Jan. 2003).

\* cited by examiner

Software 780 implementing video encoder with described techniques and tools

ADAPTIVE B-PICTURE QUANTIZATION CONTROL

BACKGROUND

With the increased popularity of DVDs, music delivery over the Internet, and digital cameras, digital media have become commonplace. Engineers use a variety of techniques to process digital audio, video, and images efficiently while still maintaining quality. To understand these techniques, it helps to understand how the audio, video, and image information is represented and processed in a computer.

I. Representation of Media Information in a Computer

A computer processes media information as a series of numbers representing that information. For example, a single number may represent the intensity of brightness or the intensity of a color component such as red, green or blue for each elementary small region of a picture, so that the digital representation of the picture consists of one or more arrays of such numbers. Each such number may be referred to as a sample. For a color image, it is conventional to use more than one sample to represent the color of each elemental region, and typically three samples are used. The set of these samples for an elemental region may be referred to as a pixel, where the word "pixel" is a contraction referring to the concept of a "picture element." For example, one pixel may consist of three samples that represent the intensity of red, green and blue light necessary to represent the elemental region. Such a pixel type is referred to as an RGB pixel. Several factors affect quality of media information, including sample depth, resolution, and frame rate (for video).

Sample depth is a property normally measured in bits that indicates the range of numbers that can be used to represent a sample. When more values are possible for the sample, quality can be higher because the number can capture more subtle variations in intensity and/or a greater range of values. Resolution generally refers to the number of samples over some duration of time (for audio) or space (for images or individual video pictures). Images with higher resolution tend to look crisper than other images and contain more discernable useful details. Frame rate is a common term for temporal resolution for video. Video with higher frame rate tends to mimic the smooth motion of natural objects better than other video, and can similarly be considered to contain more detail in the temporal dimension. For all of these factors, the tradeoff for high quality is the cost of storing and transmitting the information in terms of the bit rate necessary to represent the sample depth, resolution and frame rate, as Table 1 shows.

TABLE 1

Bit rates for different quality levels of raw video

| Bits Per Pixel (sample depth times samples per pixel) | Resolution (in pixels, Width × Height) | Frame Rate (in frames per second) | Bit Rate (in millions of bits per second) |
|---|---|---|---|
| 8 (value 0-255, monochrome) | 160 × 120 | 7.5 | 1.2 |
| 24 (value 0-255, RGB) | 320 × 240 | 15 | 27.6 |
| 24 (value 0-255, RGB) | 640 × 480 | 30 | 221.2 |
| 24 (value 0-255, RGB) | 1280 × 720 | 60 | 1327.1 |

Despite the high bit rate necessary for storing and sending high quality video (such as HDTV), companies and consumers increasingly depend on computers to create, distribute, and play back high quality content. For this reason, engineers use compression (also called source coding or source encoding) to reduce the bit rate of digital media. Compression decreases the cost of storing and transmitting the information by converting the information into a lower bit rate form. Compression can be lossless, in which quality of the video does not suffer but decreases in bit rate are limited by the complexity of the video. Or, compression can be lossy, in which quality of the video suffers but decreases in bit rate are more dramatic. Decompression (also called decoding) reconstructs a version of the original information from the compressed form. A "codec" is an encoder/decoder system.

In general, video compression techniques include "intra" compression and "inter" or predictive compression. For video frames, intra compression techniques compress individual frames, typically called I-frames or key frames. Inter compression techniques compress frames with reference to preceding and/or following frames, and inter-compressed frames are typically called predicted frames, P-frames, or B-frames.

II. Inter Compression in Windows Media Video, Versions 8 and 9

Microsoft Corporation's Windows Media Video, Version 8 ["WMV8"] includes a video encoder and a video decoder. The WMV8 encoder uses intra and inter compression, and the WMV8 decoder uses intra and inter decompression. Windows Media Video, Version 9 ["WMV9"] uses a similar architecture for many operations.

A. Intra Compression

FIG. 1 illustrates block-based intra compression 100 of a block 105 of samples in a key frame in the WMV8 encoder. A block is a set of samples, for example, an 8×8 arrangement of samples. The WMV8 encoder splits a key video frame into 8×8 blocks and applies an 8×8 Discrete Cosine Transform ["DCT"] 110 to individual blocks such as the block 105. A DCT is a type of frequency transform that converts the 8×8 block of samples (spatial information) into an 8×8 block of DCT coefficients 115, which are frequency information. The DCT operation itself is lossless or nearly lossless. Compared to the original sample values, however, the DCT coefficients are more efficient for the encoder to compress since most of the significant information is concentrated in low frequency coefficients (conventionally, the upper left of the block 115) and many of the high frequency coefficients (conventionally, the lower right of the block 115) have values of zero or close to zero.

The encoder then quantizes 120 the DCT coefficients, resulting in an 8×8 block of quantized DCT coefficients 125. Quantization is lossy. Since low frequency DCT coefficients tend to have higher values, quantization results in loss of precision but not complete loss of the information for the coefficients. On the other hand, since high frequency DCT coefficients tend to have values of zero or close to zero, quantization of the high frequency coefficients typically results in contiguous regions of zero values. In addition, in some cases high frequency DCT coefficients are quantized more coarsely than low frequency DCT coefficients, resulting in greater loss of precision/information for the high frequency DCT coefficients.

The encoder then prepares the 8×8 block of quantized DCT coefficients 125 for entropy encoding, which is a form of lossless compression. The exact type of entropy encoding can vary depending on whether a coefficient is a DC coefficient (lowest frequency), an AC coefficient (other frequencies) in the top row or left column, or another AC coefficient.

The encoder encodes the DC coefficient 126 as a differential from the DC coefficient 136 of a neighboring 8×8 block, which is a previously encoded neighbor (e.g., top or left) of the block being encoded. (FIG. 1 shows a neighbor block 135 that is situated to the left of the block being encoded in the frame.) The encoder entropy encodes 140 the differential.

The entropy encoder can encode the left column or top row of AC coefficients as a differential from a corresponding left column or top row of the neighboring 8×8 block. This is an example of AC coefficient prediction. FIG. 1 shows the left column 127 of AC coefficients encoded as a differential 147 from the left column 137 of the neighboring (in reality, to the left) block 135. The differential coding increases the chance that the differential coefficients have zero values. The remaining AC coefficients are from the block 125 of quantized DCT coefficients.

The encoder scans 150 the 8×8 block 145 of quantized AC DCT coefficients into a one-dimensional array 155 and then entropy encodes the scanned AC coefficients using a variation of run length coding 160. The encoder selects an entropy code from one or more run/level/last tables 165 and outputs the entropy code.

B. Inter Compression

Inter compression uses block-based motion compensated prediction coding followed by transform coding of the residual error. FIG. 2 illustrates motion estimation for a predicted frame 210.

In FIG. 2, the encoder computes a motion vector for a macroblock 215 in the predicted frame 210. To compute the motion vector, the encoder searches in a search area 235 of a reference frame 230. Within the search area 235, the encoder compares the macroblock 215 from the predicted frame 210 to various candidate macroblocks in order to find a candidate macroblock that is a good match. The encoder outputs information specifying the motion vector (entropy coded) for the matching macroblock. The motion vector is differentially coded with respect to a motion vector predictor.

After reconstructing the motion vector by adding the differential to the motion vector predictor, a decoder uses the motion vector to compute a prediction macroblock for the macroblock 215 using information from the reference frame 230, which is a previously reconstructed frame available at the encoder and the decoder.

The prediction is rarely perfect, so the encoder usually encodes blocks of pixel differences (also called the error or residual blocks) between the prediction macroblock and the macroblock 215 itself. The encoder encodes the residual blocks by performing a DCT on the residual blocks, quantizing the DCT coefficients and entropy encoding the quantized DCT coefficients.

III. Lossy Compression and Quantization

The preceding section mentioned quantization, a mechanism for lossy compression, and entropy coding, also called lossless compression. Lossless compression reduces the bit rate of information by removing redundancy from the information without any reduction in fidelity. For example, a series of ten consecutive pixels that are all exactly the same shade of red could be represented as a code for the particular shade of red and the number ten as a "run length" of consecutive pixels, and this series can be perfectly reconstructed by decompression from the code for the shade of red and the indicated number (ten) of consecutive pixels having that shade of red. Lossless compression techniques reduce bit rate at no cost to quality, but can only reduce bit rate up to a certain point. Decreases in bit rate are limited by the inherent amount of variability in the statistical characterization of the input data, which is referred to as the source entropy.

In contrast, with lossy compression, the quality suffers somewhat but the achievable decrease in bit rate is more dramatic. For example, a series of ten pixels, each being a slightly different shade of red, can be approximated as ten pixels with exactly the same particular approximate red color. Lossy compression techniques can be used to reduce bit rate more than lossless compression techniques, but some of the reduction in bit rate is achieved by reducing quality, and the lost quality cannot be completely recovered. Lossy compression is often used in conjunction with lossless compression—in a system design in which the lossy compression establishes an approximation of the information and lossless compression techniques are applied to represent the approximation. For example, the series of ten pixels, each a slightly different shade of red, can be represented as a code for one particular shade of red and the number ten as a run-length of consecutive pixels. In general, an encoder varies quantization to trade off quality and bit rate. Coarser quantization results in greater quality reduction but allows for greater bit rate reduction. In decompression, the original series would then be reconstructed as ten pixels with the same approximated red color.

According to one possible definition, quantization is a term used for an approximating non-reversible mapping function commonly used for lossy compression, in which there is a specified set of possible output values, and each member of the set of possible output values has an associated set of input values that result in the selection of that particular output value. A variety of quantization techniques have been developed, including scalar or vector, uniform or non-uniform, and adaptive or non-adaptive quantization.

A. Scalar Quantizers

According to one possible definition, a scalar quantizer is an approximating functional mapping $x \rightarrow Q[x]$ of an input value x to a quantized value Q[x]. FIG. 3 shows a "staircase" I/O function (300) for a scalar quantizer. The horizontal axis is a number line for a real number input variable x, and the vertical axis indicates the corresponding quantized values Q[x]. The number line is partitioned by thresholds such as the threshold (310). Each value of x within a given range between a pair of adjacent thresholds is assigned the same quantized value Q[x]. For example, each value of x within the range (320) is assigned the same quantized value (330). (At a threshold, one of the two possible quantized values is assigned to an input x, depending on the system.) Overall, the quantized values Q[x] exhibit a discontinuous, staircase pattern. The distance the mapping continues along the number line depends on the system, typically ending after a finite number of thresholds. The placement of the thresholds on the number line may be uniformly spaced (as shown in FIG. 3) or non-uniformly spaced.

A scalar quantizer can be decomposed into two distinct stages. The first stage is the classifier stage, in which a classifier function mapping $x \rightarrow A[x]$ maps an input x to a quantization index A[x], which is often integer-valued. In essence, the classifier segments an input number line or data set. FIG. 4a shows a generalized classifier (400) and thresholds for a scalar quantizer. As in FIG. 3, a number line for a real number variable x is segmented by thresholds such as the threshold (410). Each value of x within a given range such as the range (420) is assigned the same quantized value Q[x]. FIG. 4b shows a numerical example of a classifier (450) and thresholds for a scalar quantizer.

In the second stage, a reconstructor functional mapping $k \rightarrow \beta[k]$ maps each quantization index k to a reconstruction value $\beta[k]$. In essence, the reconstructor places steps having a particular height relative to the input number line segments (or selects a subset of data set values) for reconstruction of each region determined by the classifier. The reconstructor functional mapping may be implemented, for example, using a lookup table. Overall, the classifier relates to the reconstructor as follows:

$$Q[x]=\beta[A[x]] \quad (1).$$

In common usage, the term "quantization" is often used to describe the classifier stage, which is performed during encoding. The term "inverse quantization" is similarly used to describe the reconstructor stage, whether performed during encoding or decoding.

The distortion introduced by using such a quantizer may be computed with a difference-based distortion measure $d(x-Q[x])$. Typically, such a distortion measure has the property that $d(x-Q[x])$ increases as $x-Q[x]$ deviates from zero; and typically each reconstruction value lies within the range of the corresponding classification region, so that the straight line that would be formed by the functional equation $Q[x]=x$ will pass through every step of the staircase diagram (as shown in FIG. 3) and therefore $Q[Q[x]]$ will typically be equal to $Q[x]$. In general, a quantizer is considered better in rate-distortion terms if the quantizer results in a lower average value of distortion than other quantizers for a given bit rate of output. More formally, a quantizer is considered better if, for a source random variable X, the expected (i.e., the average or statistical mean) value of the distortion measure $\overline{D}=E_X\{d(X-Q[X])\}$ is lower for an equal or lower entropy H of $A[X]$. The most commonly-used distortion measure is the squared error distortion measure, for which $d(|x-y|)=|x-y|^2$. When the squared error distortion measure is used, the expected value of the distortion measure ($\overline{D}$) is referred to as the mean squared error.

B. Non-uniform Quantizers

A non-uniform quantizer has threshold values that are not uniformly spaced for all classifier regions. According to one possible definition, a dead zone plus uniform threshold quantizer ["DZ+UTQ"] is a quantizer with uniformly spaced threshold values for all classifier regions except the one containing the zero input value (which is called the dead zone ["DZ"]). In a general sense, a DZ+UTQ is a non-uniform quantizer, since the DZ size is different than the other classifier regions.

A DZ+UTQ has a classifier index mapping rule $x \rightarrow A[x]$ that can be expressed based on two parameters. FIG. 5 shows a staircase I/O function (500) for a DZ+UTQ, and FIG. 6a shows a generalized classifier (600) and thresholds for a DZ+UTQ. The parameter s, which is greater than 0, indicates the step size for all steps other than the DZ. Mathematically, all $s_i$ are equal to s for $i \neq 0$. The parameter z, which is greater than or equal to 0, indicates the ratio of the DZ size to the size of the other steps. Mathematically, $s_0=z \cdot s$. In FIG. 6a, z is 2, so the DZ is twice as wide as the other classification zones. The index mapping rule $x \rightarrow A[x]$ for a DZ+UTQ can be expressed as:

$$A[x] = sign(x) * \max\left(0, \left\lfloor \frac{|x|}{s} - \frac{z}{2} + 1 \right\rfloor\right), \quad (2)$$

where $\lfloor \cdot \rfloor$ denotes the smallest integer less than or equal to the argument and where $sign(x)$ is the function defined as:

$$sign(X) = \begin{cases} +1, & \text{for } x \geq 0, \\ -1, & \text{for } x < 0. \end{cases} \quad (3)$$

FIG. 6b shows a numerical example of a classifier (650) and thresholds for a DZ+UTQ with s=1 and z=2. FIGS. 3, 4a, and 4b show a special case DZ+UTQ with z=1. Quantizers of the UTQ form have good performance for a variety of statistical sources. In particular, the DZ+UTQ form is optimal for the statistical random variable source known as the Laplacian source.

C. Reconstruction Rules

Different reconstruction rules may be used to determine the reconstruction value for each quantization index. Standards and product specifications that focus only on achieving interoperability will often specify reconstruction values without necessarily specifying the classification rule. In other words, some specifications may define the functional mapping $k \rightarrow \beta[k]$ without defining the functional mapping $x \rightarrow A[x]$. This allows a decoder built to comply with the standard/specification to reconstruct information correctly. In contrast, encoders are often given the freedom to change the classifier in any way that they wish, while still complying with the standard/specification.

Numerous systems for adjusting quantization thresholds have been developed. Many standards and products specify reconstruction values that correspond to a typical mid-point reconstruction rule (e.g., for a typical simple classification rule) for the sake of simplicity. For classification, however, the thresholds can in fact be adjusted so that certain input values will be mapped to more common (and hence, lower bit rate) indices, which makes the reconstruction values closer to optimal.

In many systems, the extent of quantization is measured in terms of quantization step size. Coarser quantization uses larger quantization step sizes, corresponding to wider ranges of input values. Finer quantization uses smaller quantization step sizes. Often, for purposes of signaling and reconstruction, quantization step sizes are parameterized as multiples of a smallest quantization step size.

D. Perceptual Effects of Quantization

As mentioned above, lossy compression tends to cause a decrease in quality. For example, a series of ten samples of slightly different values can be approximated using quantization as ten samples with exactly the same particular approximate value. This kind of quantization can reduce the bit rate of encoding the series of ten samples, but at the cost of lost detail in the original ten samples. In some cases, quantization also can produce visible artifacts that tend to be more artificial-looking and visually distracting than simple loss of fine detail. For example, smooth, un-textured content is susceptible to contouring artifacts—artifacts that appear between regions of two different quantization output values—because the human visual system is sensitive to subtle differences (particularly luma differences) between adjacent areas of flat color.

Another perceptual effect of quantization occurs when average quantization step sizes are varied between frames in a sequence. Although the flexibility to change quantization step sizes can help control bit rate, an unpleasant "flicker" effect can occur when average quantization step sizes vary too much from frame to frame and the difference in quality between frames becomes noticeable.

IV. Signaling Quantization Parameters in VC-1

In some systems, an encoder can use different quantizers and different quantization step size parameters ("QPs") for different sequences, different frames, and different parts of frames.

For example, a VC-1 encoder specifies a quantizer used for a video sequence. The encoder sends a 2-bit bitstream element ("QUANTIZER") at sequence level in a bitstream syntax to indicate a quantizer type for the sequence. QUANTIZER indicates that the quantizer for the sequence is specified as being uniform or non-uniform at frame level, that the encoder uses a non-uniform quantizer for all frames, or that the encoder uses a uniform quantizer for all frames. Whether the encoder uses a uniform quantizer or non-uniform quantizer, the encoder sends a frame-level bitstream element, PQINDEX, to indicate a default frame QP ("PQUANT"). If QUANTIZER indicates an implicitly specified quantizer, PQINDEX also indicates whether the quantizer used is uniform or non-uniform. If QUANTIZER indicates an explicitly specified quantizer, the frame-level bitstream element PQUANTIZER is sent to indicate whether the quantizer for the frame is uniform or non-uniform. PQINDEX is present, and PQUANTIZER is present if required, in all frame types.

Table 2 shows how PQINDEX is translated to PQUANT for the case where QUANTIZER=0 (indicating the quantizer is implicit and hence specified by PQINDEX).

TABLE 2

Implicit quantizer translation in a WMV encoder

| PQINDEX | PQUANT | Quantizer | PQINDEX | PQUANT | Quantizer |
|---|---|---|---|---|---|
| 0 | Reserved | NA | 16 | 13 | Non-uniform |
| 1 | 1 | Uniform | 17 | 14 | Non-uniform |
| 2 | 2 | Uniform | 18 | 15 | Non-uniform |
| 3 | 3 | Uniform | 19 | 16 | Non-uniform |
| 4 | 4 | Uniform | 20 | 17 | Non-uniform |
| 5 | 5 | Uniform | 21 | 18 | Non-uniform |
| 6 | 6 | Uniform | 22 | 19 | Non-uniform |
| 7 | 7 | Uniform | 23 | 20 | Non-uniform |
| 8 | 8 | Uniform | 24 | 21 | Non-uniform |
| 9 | 6 | Non-uniform | 25 | 22 | Non-uniform |
| 10 | 7 | Non-uniform | 26 | 23 | Non-uniform |
| 11 | 8 | Non-uniform | 27 | 24 | Non-uniform |
| 12 | 9 | Non-uniform | 28 | 25 | Non-uniform |
| 13 | 10 | Non-uniform | 29 | 27 | Non-uniform |
| 14 | 11 | Non-uniform | 30 | 29 | Non-uniform |
| 15 | 12 | Non-uniform | 31 | 31 | Non-uniform |

If the quantizer is signaled explicitly at the sequence or frame level (signaled by syntax element QUANTIZER=01, 10 or 11), then PQUANT is equal to PQINDEX for all non-zero values of PQINDEX.

V. Other Standards and Products

Numerous international standards specify aspects of video decoders and formats for compressed video information. Directly or by implication, these standards also specify certain encoder details, but other encoder details are not specified. Some standards address still image compression/decompression, and other standards address audio compression/decompression. Numerous companies have produced encoders and decoders for audio, still images, and video. Various other kinds of signals (for example, hyperspectral imagery, graphics, text, financial information, etc.) are also commonly represented and stored or transmitted using compression techniques.

Standards typically do not fully specify the quantizer design. Most allow some variation in the encoder classification rule $x \rightarrow A[x]$ and/or the decoder reconstruction rule $k \rightarrow \beta[k]$.

The use of a DZ ratio $z=2$ or greater has been implicit in a number of encoding designs. For example, the spacing of reconstruction values for predicted regions in some standards implies use of $z>2$. Reconstruction values in these examples from standards are spaced appropriately for use of DZ+UTQ classification with $z=2$ and mid-point reconstruction. Altering thresholds to increase optimality for the specified reconstruction values (as described above) results in an even larger DZ ratio (since the DZ requires fewer bits to select than the other levels).

Designs based on $z=1$ (or at least $z<2$) have been used for quantization in several standards. In these cases, reconstruction values are equally spaced around zero and away from zero.

Given the critical importance of video compression to digital video, it is not surprising that video compression is a richly developed field. Whatever the benefits of previous video compression techniques, however, they do not have the advantages of the following techniques and tools.

SUMMARY

The present application is directed to techniques and tools for adapting the quantizer as well as the quantization step size used during video encoding. For example, a video encoder uses a non-uniform quantizer (having a relatively large dead zone ratio) for B-picture types, but uses a uniform quantizer for other types of pictures. In many encoding scenarios, this helps the encoder control bit rate for the B-picture types instead of resorting to higher quantization step sizes, which improves overall quality for the B-picture types.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In one aspect, a video encoder selects a picture type (e.g., a B-picture type) for a current picture and uses the selected picture type when selecting between multiple available quantizers for the current picture. Each of the multiple available quantizers has a different dead zone ratio. The selected quantizer for the current picture (e.g., a non-uniform quantizer) has a larger dead zone ratio than one or more other quantizers among the multiple available quantizers. The encoder applies the selected quantizer to the current picture and outputs encoded data for the current picture. The larger dead zone ratio of the selected quantizer for the current picture applies for AC coefficients but not for DC coefficients. For example, the larger dead zone ratio results in larger dead zone regions that each have a size that is a function of a quantization step size (QP). For AC coefficients, and the size can be approximately 0.8*QP on each side of zero for each QP of the selected quantizer, and for DC coefficients, the size can be equal to 0.5*QP on each side of zero for each QP of the quantizer.

In another aspect, if a current picture is a P-picture or an I-picture, an encoder selects a uniform quantizer with uniform dead zone for AC coefficients for the current picture, and applies the selected uniform quantizer to the current picture. If the current picture is a B-picture, the encoder selects a non-uniform quantizer with a non-uniform dead zone for AC coefficients for the current picture, where the non-uniform dead zone is larger than the uniform dead zone of the uniform quantizers.

In another aspect, an encoder comprises a frequency transformer for frequency transforming plural blocks of spatial domain information into plural blocks of transform coefficients, a quantizer for quantizing the transform coefficients, an entropy encoder for entropy encoding the quantized transform coefficients, an inverse quantizer for inverse quantizing the quantized transform coefficients, and a controller for selecting (e.g., by using picture type) quantizers (e.g., uniform or non-uniform quantizers) and quantization step sizes for the quantizing. The controller chooses between plural available quantizers, each of the plural available quantizers having a different dead zone ratio. The controller implements a first path for increasing dead zone ratio while decreasing quantization step size for a given level of rate-distortion performance, and a second path for decreasing dead zone ratio while increasing quantization step size for the given level of rate-distortion performance. The controller can follow the first path if a current picture is a B-picture type and otherwise follow the second path. For a current picture, the encoder can select a first quantizer from among the plural available quantizers if the current picture has a B-picture type and otherwise select a second quantizer from among the plural available quantizers. The encoder can further comprise a motion estimator for estimating motion in predicted pictures from reference pictures, a motion compensator for applying the estimated motion, and one or more reference picture buffers for storing the reference pictures.

The foregoing and other objects, features, and advantages will become more apparent from the following detailed description, which proceeds with reference to the accompanying figures.

DETAILED DESCRIPTION

The present application relates to techniques and tools for efficient compression of video. In various described embodiments, a video encoder incorporates techniques for encoding video, and corresponding signaling techniques for use with a bitstream format or syntax comprising different layers or levels. Described techniques and tools can be applied to interlaced or progressive frames. A decoder can perform corresponding decoding.

Various alternatives to the implementations described herein are possible. For example, techniques described with reference to flowchart diagrams can be altered by changing the ordering of stages shown in the flowcharts, by repeating or omitting certain stages, etc. As another example, although some implementations are described with reference to specific macroblock formats, other formats also can be used.

The various techniques and tools can be used in combination or independently. Different embodiments implement one or more of the described techniques and tools. Some techniques and tools described herein can be used in a video encoder, or in some other system not specifically limited to video encoding.

I. Computing Environment

Figure 1:
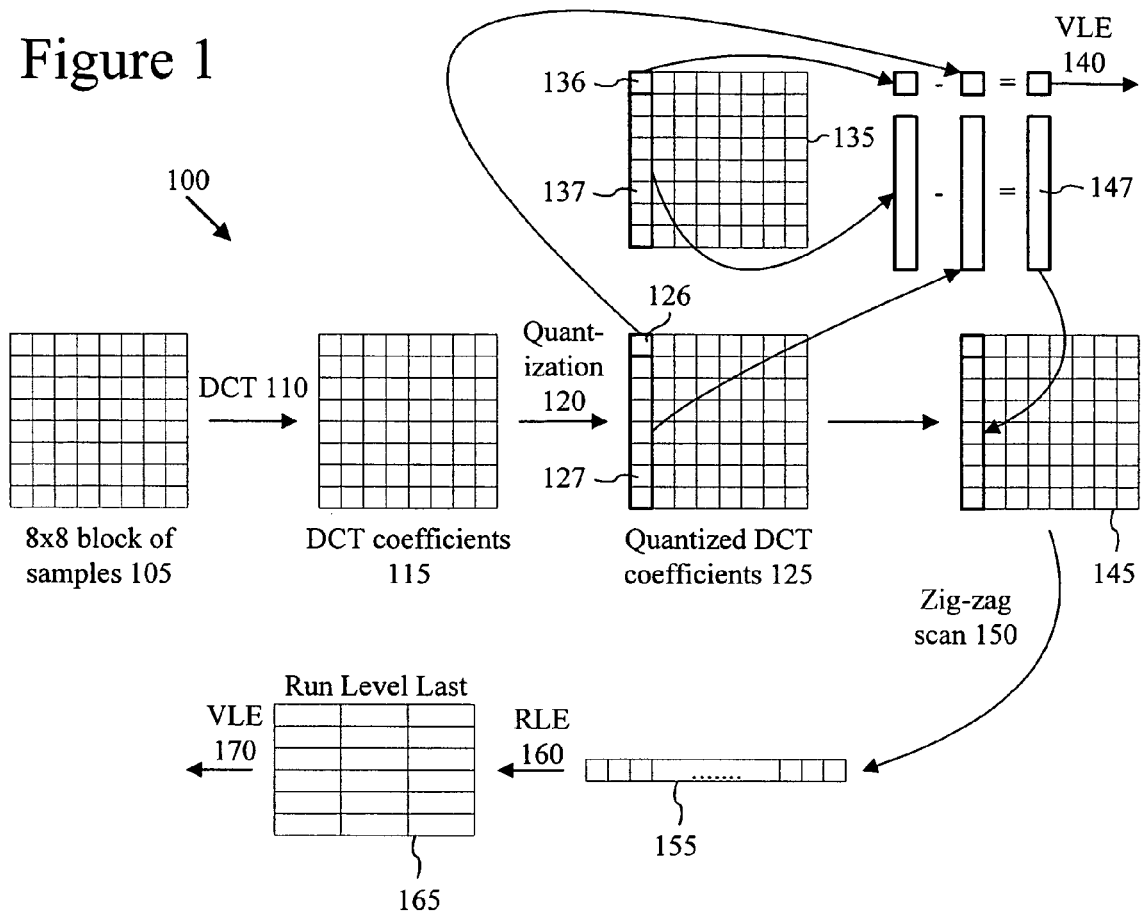
FIG. 1 is a diagram showing block-based intraframe compression of an 8×8 block of samples.
Figure 2:
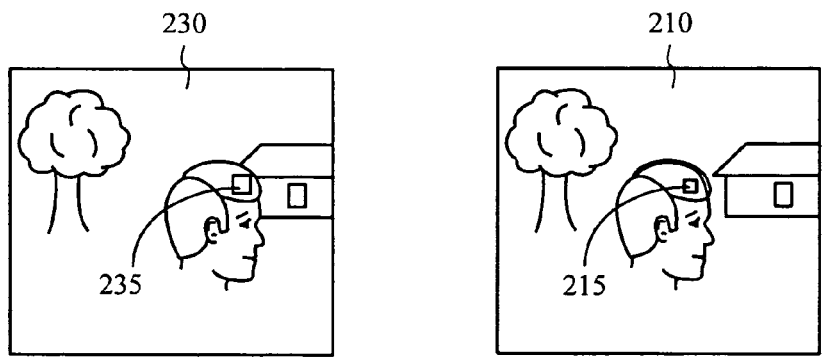
FIG. 2 is a diagram showing motion estimation in a video encoder.
Figure 3:
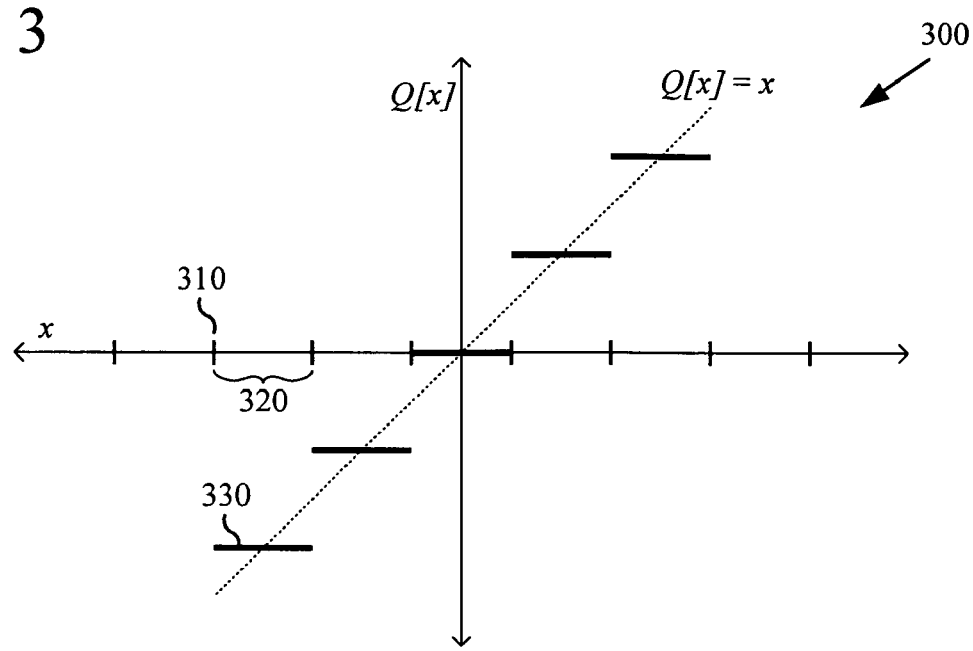
FIG. 3 is a chart showing a staircase I/O function for a scalar quantizer.
Figure 4A:
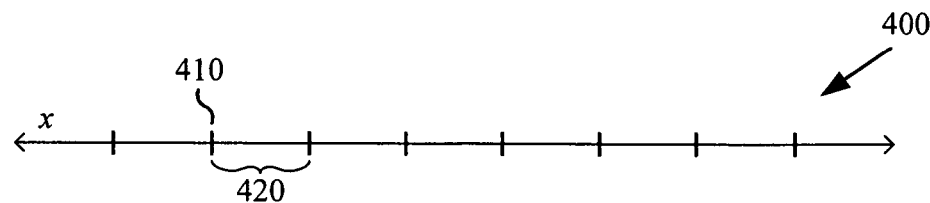
FIGS. 4A and 4B are charts showing classifiers and thresholds for scalar quantizers.
Figure 4B:
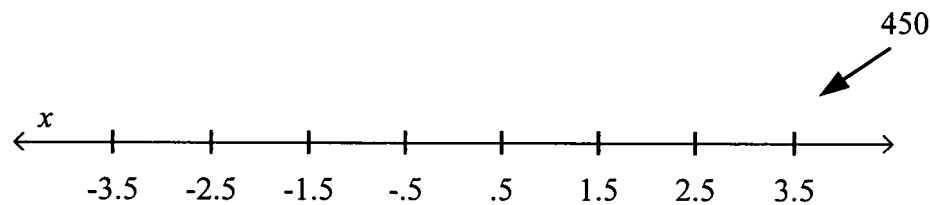
Figure 5:
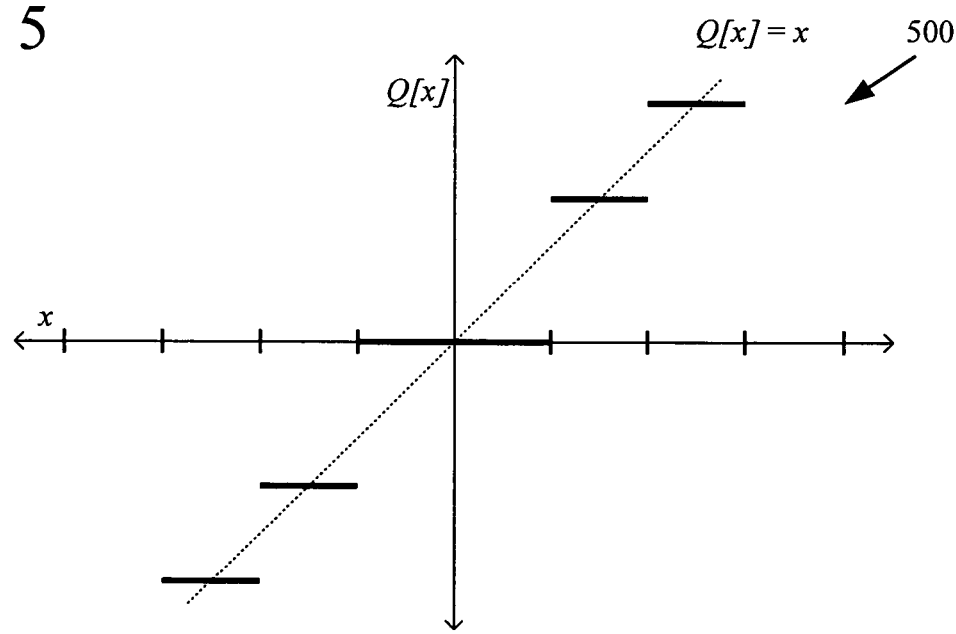
FIG. 5 is a chart showing a staircase I/O function for a DZ+UTQ.
Figure 6A:
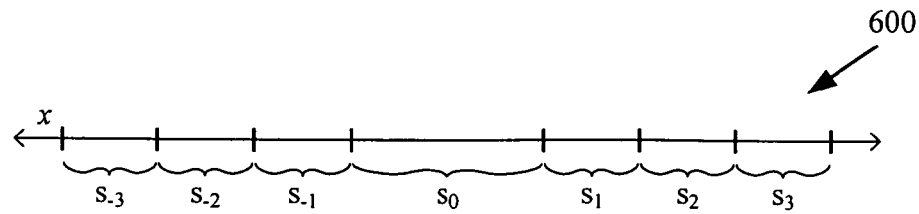
FIGS. 6A and 6B are charts showing classifiers and thresholds for DZ+UTQs.
Figure 6B:
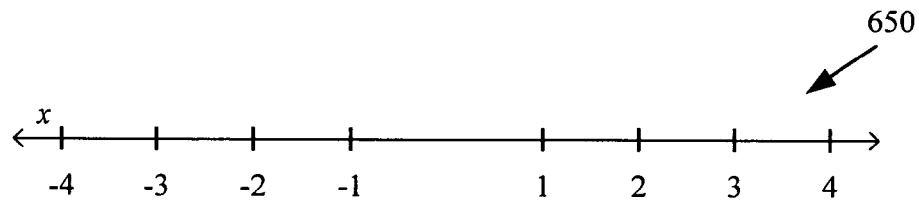
Figure 7:
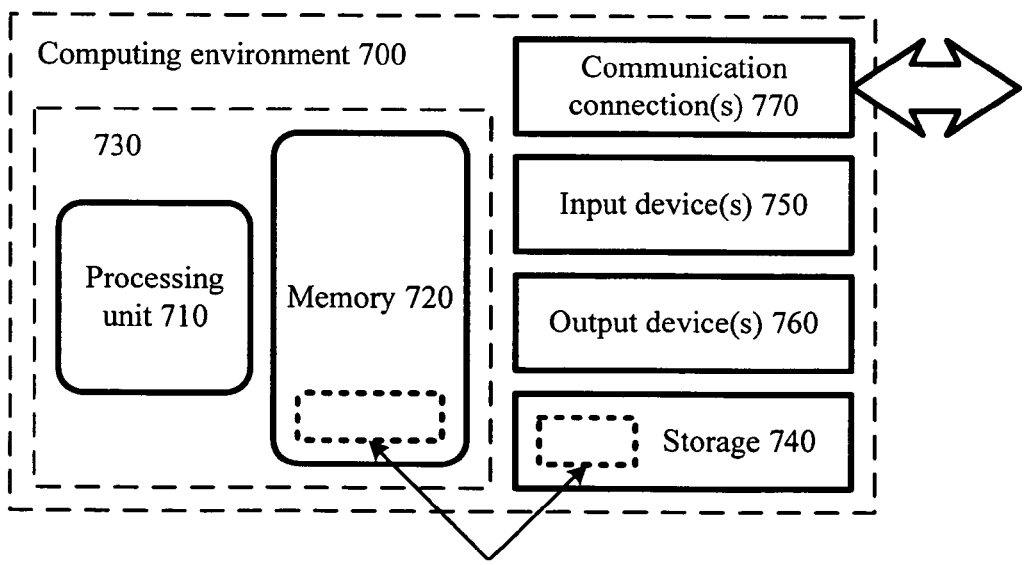
FIG. 7 is a block diagram of a suitable computing environment in conjunction with which several described embodiments may be implemented.

FIG. 7 illustrates a generalized example of a suitable computing environment 700 in which several of the described embodiments may be implemented. The computing environment 700 is not intended to suggest any limitation as to scope of use or functionality, as the techniques and tools may be implemented in diverse general-purpose or special-purpose computing environments.

With reference to FIG. 7, the computing environment 700 includes at least one processing unit 710 and memory 720. In FIG. 7, this most basic configuration 730 is included within a dashed line. The processing unit 710 executes computer-executable instructions and may be a real or a virtual processor. In a multi-processing system, multiple processing units execute computer-executable instructions to increase processing power. The memory 720 may be volatile memory (e.g., registers, cache, RAM), non-volatile memory (e.g., ROM, EEPROM, flash memory, etc.), or some combination of the two. The memory 720 stores software 780 implementing a video encoder with one or more of the described techniques and tools.

A computing environment may have additional features. For example, the computing environment 700 includes storage 740, one or more input devices 750, one or more output devices 760, and one or more communication connections 770. An interconnection mechanism (not shown) such as a bus, controller, or network interconnects the components of the computing environment 700. Typically, operating system software (not shown) provides an operating environment for other software executing in the computing environment 700, and coordinates activities of the components of the computing environment 700.

The storage 740 may be removable or non-removable, and includes magnetic disks, magnetic tapes or cassettes, CD-ROMs, DVDs, or any other medium which can be used to store information and which can be accessed within the computing environment 700. The storage 740 stores instructions for the software 780 implementing the video encoder.

The input device(s) 750 may be a touch input device such as a keyboard, mouse, pen, or trackball, a voice input device, a scanning device, or another device that provides input to the computing environment 700. For audio or video encoding, the input device(s) 750 may be a sound card, video card, TV tuner card, or similar device that accepts audio or video input in analog or digital form, or a CD-ROM or CD-RW that reads audio or video samples into the computing environment 700. The output device(s) 760 may be a display, printer, speaker, CD-writer, or another device that provides output from the computing environment 700.

The communication connection(s) 770 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

The techniques and tools can be described in the general context of computer-readable media. Computer-readable media are any available media that can be accessed within a computing environment. By way of example, and not limitation, with the computing environment 700, computer-readable media include memory 720, storage 740, communication media, and combinations of any of the above.

The techniques and tools can be described in the general context of computer-executable instructions, such as those included in program modules, being executed in a computing environment on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing environment.

For the sake of presentation, the detailed description uses terms like "estimate" and "analyze" to describe computer operations in a computing environment. These terms are high-level abstractions for operations performed by a computer, and should not be confused with acts performed by a human being. The actual computer operations corresponding to these terms vary depending on implementation.

II. Generalized Video Encoder

Figure 8:
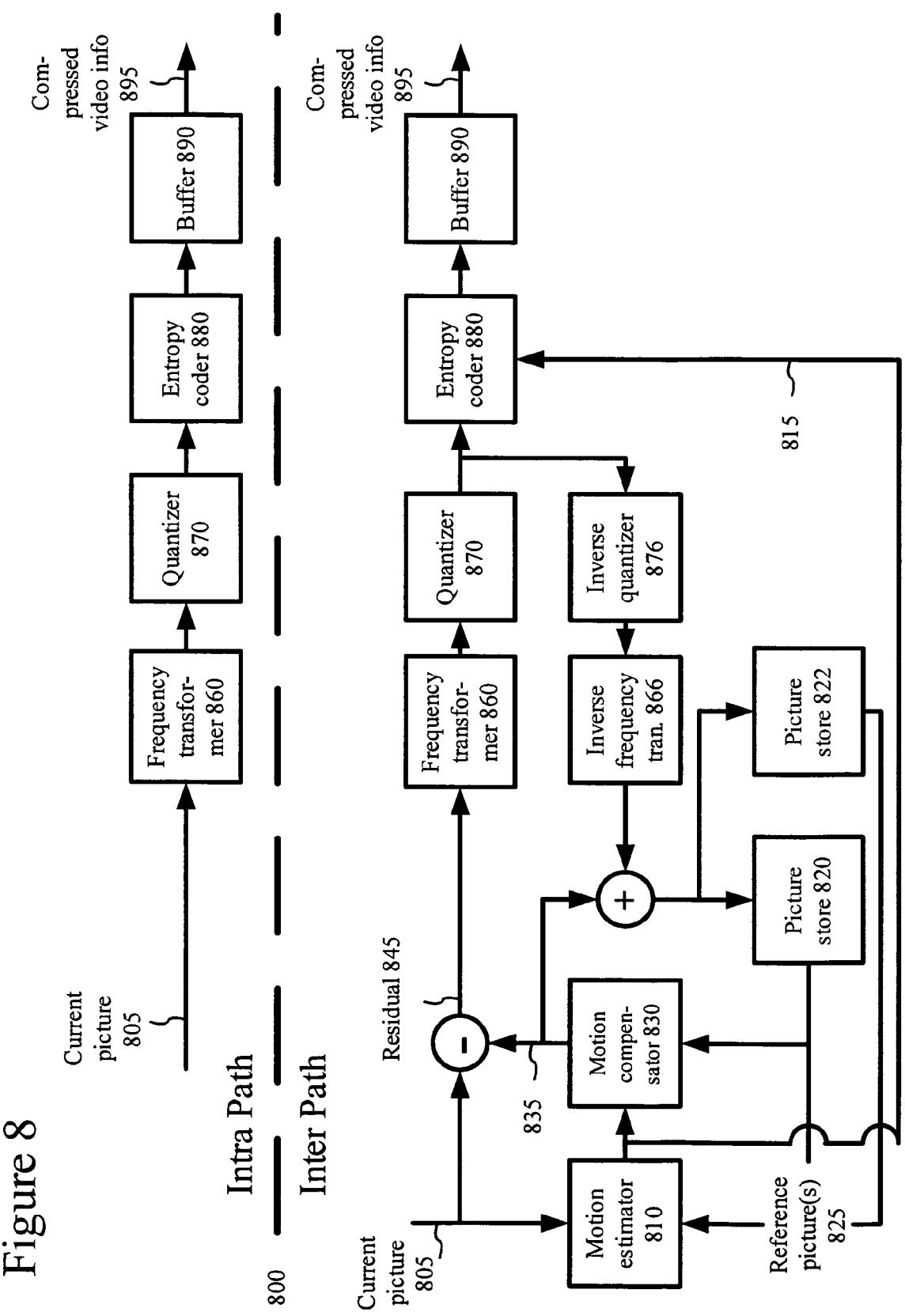
FIG. 8 is a block diagram of a generalized video encoder system in conjunction with which several described embodiments may be implemented.

FIG. 8 is a block diagram of a generalized video encoder 800 in conjunction with which some described embodiments may be implemented. The encoder 800 receives a sequence of video pictures including a current picture 805 and produces compressed video information 895 as output to storage, a buffer, or a communication connection. The format of an output bitstream can be a Windows Media Video or VC-1 format, MPEG-x format (e.g., MPEG-1, MPEG-2, or MPEG-4), H.26x format (e.g., H.261, H.262, H.263, or H.264), or other format.

Figure 9:
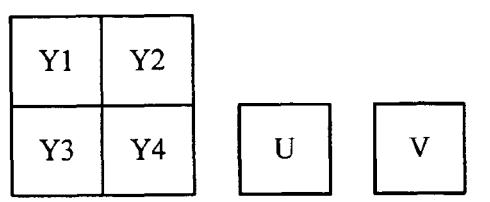
FIG. 9 is a diagram of a macroblock format used in several described embodiments.

The encoder 800 processes video pictures. The term picture generally refers to source, coded or reconstructed image data. For progressive video, a picture is a progressive video frame. For interlaced video, a picture may refer to an interlaced video frame, the top field of the frame, or the bottom field of the frame, depending on the context. The encoder 800 is block-based and uses a 4:2:0 macroblock format for frames. As shown in FIG. 9, macroblock 900 includes four 8×8 luminance (or luma) blocks (Y1 through Y4) and two 8×8 chrominance (or chroma) blocks (U and V) that are co-located with the four luma blocks but half resolution horizontally and vertically, following the conventional 4:2:0 macroblock format. For fields, the same or a different macroblock organization and format may be used. The 8×8 blocks may be further sub-divided at different stages, e.g., at the frequency transform and entropy encoding stages. The encoder 800 can perform operations on sets of samples of different size or configuration than 8×8 blocks and 16×16 macroblocks. Alternatively, the encoder 800 is object-based or uses a different macroblock or block format.

Returning to FIG. 8, the encoder system 800 compresses predicted pictures and intra-coded, key pictures. For the sake of presentation, FIG. 8 shows a path for key pictures through the encoder system 800 and a path for predicted pictures. Many of the components of the encoder system 800 are used for compressing both key pictures and predicted pictures. The exact operations performed by those components can vary depending on the type of information being compressed.

A predicted picture (e.g., progressive P-frame or B-frame, interlaced P-field or B-field, or interlaced P-frame or B-frame) is represented in terms of prediction (or difference) from one or more other pictures (which are typically referred to as reference pictures or anchors). A prediction residual is the difference between what was predicted and the original picture. In contrast, a key picture (e.g., progressive I-frame, interlaced I-field, or interlaced I-frame) is compressed without reference to other pictures.

If the current picture 805 is a predicted picture, a motion estimator 810 estimates motion of macroblocks or other sets of samples of the current picture 805 with respect to one or more reference pictures, for example, the reconstructed previous picture 825 buffered in the picture store 820. If the current picture 805 is a bi-predictive picture, a motion estimator 810 estimates motion in the current picture 805 with respect to up to four reconstructed reference pictures (for an interlaced B-field, for example). Typically, a motion estimator estimates motion in a B-picture with respect to one or more temporally previous reference pictures and one or more temporally future reference pictures, but B-pictures need not be predicted from different temporal directions. The encoder system 800 can use the separate stores 820 and 822 for multiple reference pictures.

The motion estimator 810 can estimate motion by full-sample, ½-sample, ¼-sample, or other increments, and can switch the precision of the motion estimation on a picture-by-picture basis or other basis. The motion estimator 810 (and compensator 830) also can switch between types of reference picture sample interpolation (e.g., between bicubic and bilinear) on a per-frame or other basis. The precision of the motion estimation can be the same or different horizontally and vertically. The motion estimator 810 outputs as side information motion information 815 such as differential motion vector information. The encoder 800 encodes the motion information 815 by, for example, computing one or more predictors for motion vectors, computing differentials between the motion vectors and predictors, and entropy coding the differentials. To reconstruct a motion vector, a motion compensator 830 combines a predictor with differential motion vector information.

The motion compensator 830 applies the reconstructed motion vector to the reconstructed picture(s) 825 to form a motion-compensated current picture 835. The prediction is rarely perfect, however, and the difference between the motion-compensated current picture 835 and the original current picture 805 is the prediction residual 845. During later reconstruction of the picture, the prediction residual 845 is added to the motion compensated current picture 835 to obtain a reconstructed picture that is closer to the original current picture 805. In lossy compression, however, some information is still lost from the original current picture 805. Alternatively, a motion estimator and motion compensator apply another type of motion estimation/compensation.

A frequency transformer 860 converts the spatial domain video information into frequency domain (i.e., spectral) data. For block-based video pictures, the frequency transformer 860 applies a DCT, variant of DCT, or other block transform to blocks of the sample data or prediction residual data, producing blocks of frequency transform coefficients. Alternatively, the frequency transformer 860 applies another conventional frequency transform such as a Fourier transform or uses wavelet or sub-band analysis. The frequency transformer 860 may apply an 8×8, 8×4, 4×8, 4×4 or other size frequency transform.

A quantizer 870 then quantizes the blocks of spectral data coefficients. The quantizer applies uniform, scalar quantization to the spectral data with a step-size that varies on a picture-by-picture basis or other basis (e.g., a macroblock-by-macroblock basis). Alternatively, the quantizer applies another type of quantization to the spectral data coefficients, for example, a non-uniform, vector, or non-adaptive quantization, or directly quantizes spatial domain data in an encoder system that does not use frequency transformations. Techniques and tools relating to quantization in some implementations are described in detail below.

In addition to adaptive quantization, the encoder 800 can use frame dropping, adaptive filtering, or other techniques for rate control.

The encoder 800 may use special signaling for a skipped macroblock, which is a macroblock that has no information of certain types (e.g., no differential motion vectors for the macroblock and no residual information).

When a reconstructed current picture is needed for subsequent motion estimation/compensation, an inverse quantizer 876 performs inverse quantization on the quantized spectral data coefficients. An inverse frequency transformer 866 then performs the inverse of the operations of the frequency transformer 860, producing a reconstructed prediction residual (for a predicted picture) or a reconstructed key picture. If the current picture 805 was a key picture, the reconstructed key picture is taken as the reconstructed current picture (not shown). If the current picture 805 was a predicted picture, the reconstructed prediction residual is added to the motion-compensated current picture 835 to form the reconstructed current picture. One or both of the picture stores 820, 822 buffers the reconstructed current picture for use in motion compensated prediction. In some embodiments, the encoder applies a de-blocking filter to the reconstructed frame to adaptively smooth discontinuities and other artifacts in the picture.

The entropy coder 880 compresses the output of the quantizer 870 as well as certain side information (e.g., motion information 815, quantization step size (QP)). Typical entropy coding techniques include arithmetic coding, differential coding, Huffman coding, run length coding, LZ coding, dictionary coding, and combinations of the above. The entropy coder 880 typically uses different coding techniques for different kinds of information (e.g., DC coefficients, AC coefficients, different kinds of side information), and can choose from among multiple code tables within a particular coding technique.

The entropy coder 880 provides compressed video information 895 to the multiplexer ("MUX") 890. The MUX 890 may include a buffer, and a buffer level indicator may be fed back to a controller. Before or after the MUX 890, the compressed video information 895 can be channel coded for transmission over the network. The channel coding can apply error detection and correction data to the compressed video information 895.

A controller (not shown) receives inputs from various modules such as the motion estimator 810, frequency transformer 860, quantizer 870, inverse quantizer 876, entropy coder 880, and buffer 890. The controller evaluates intermediate results during encoding, for example, estimating distortion and performing other rate-distortion analysis. The controller works with modules such as the motion estimator 810, frequency transformer 860, quantizer 870, and entropy coder 880 to set and change coding parameters during encoding. When an encoder evaluates different coding parameter choices during encoding, the encoder may iteratively perform certain stages (e.g., quantization and inverse quantization) to evaluate different parameter settings. The encoder may set parameters at one stage before proceeding to the next stage. Or, the encoder may jointly evaluate different coding parameters. The tree of coding parameter decisions to be evaluated, and the timing of corresponding encoding, depends on implementation.

The relationships shown between modules within the encoder 800 indicate general flows of information in the encoder; other relationships are not shown for the sake of simplicity. In particular, FIG. 8 usually does not show side information indicating the encoder settings, modes, tables, etc. used for a video sequence, picture, macroblock, block, etc. Such side information, once finalized, is sent in the output bitstream, typically after entropy encoding of the side information.

Particular embodiments of video encoders typically use a variation or supplemented version of the generalized encoder 800. Depending on implementation and the type of compression desired, modules of the encoder can be added, omitted, split into multiple modules, combined with other modules, and/or replaced with like modules. For example, the controller can be split into multiple controller modules associated with different modules of the encoder. In alternative embodiments, encoders with different modules and/or other configurations of modules perform one or more of the described techniques.

III. Adaptive B-Picture Quantization Control

When encoding video, overall coding quality can be improved if fewer bits are allocated to B-pictures than to I-pictures and P-pictures. Bits saved in B-pictures can be used to improve the quality of I-pictures and P-pictures. Unlike I-pictures and P-pictures, B-pictures are generally not used as reference pictures for other pictures in motion compensation. For this reason, slightly reducing the quality of B-pictures (e.g., by increasing a quantization step size) will not affect the quality of other frames. In addition, the quality gain from spending more bits in B-pictures (e.g., by using smaller quantization step sizes) is not as significant as the gain from spending bits in I-pictures and P-pictures.

Although the flexibility to change quantization for different picture types can help control bit rate and improve quality, an unpleasant "flicker" effect can occur when quantization step sizes vary too much and the difference in quality between frames becomes noticeable. Thus, if quantization step size is increased too much for B-pictures relative to other pictures in a sequence, unpleasant perceptual effects can occur.

Accordingly, described techniques and tools are directed to a rate control scheme for B-pictures that combines quantization step size control with adaptive dead zone control. Using adaptive dead zone control in a B-picture can save bits more efficiently than simply raising quantization step size. It also reduces visual artifacts.

Suppose an encoder needs to encode a B-picture with n bits, and that the encoder evaluates two quantization options. With the first option, the encoder uses a high quantization step size and quantizer with a smaller dead zone ratio. With the second option, the encoder uses a lower quantization step and quantizer with a larger dead zone ratio. The wider dead zone of the second option tends to introduce more distortion than the smaller dead zone of the first option. The overall mix of distortion from the wider dead zone and lower quantization step size (second option) is often less perceptible, however, than the distortion from the higher quantization step size (first option).

In one implementation, an encoder uses an explicit quantization mode to signal various decisions in a bitstream relating to quantization for B-pictures. Tests have shown noticeable visual improvement over an implicit quantization mode.

For example, an encoder that uses either uniform or non-uniform quantization in a sequence sets the dead zone to 1.2*QP (0.6*QP on each side of zero) for uniform quantization and sets the dead zone to 1.6*QP (0.8*QP on each side of zero) for non-uniform quantization. For B-pictures, the encoder always uses non-uniform quantization, so all B-pictures use a dead zone of 1.6*QP. The specific calculations for dead zone thresholds can vary depending on implementation, and the dead zone thresholds can be the same as or different (e.g., wider) than the mid-points between zero and the first reconstruction points according to reconstruction rules.

Figure 10:
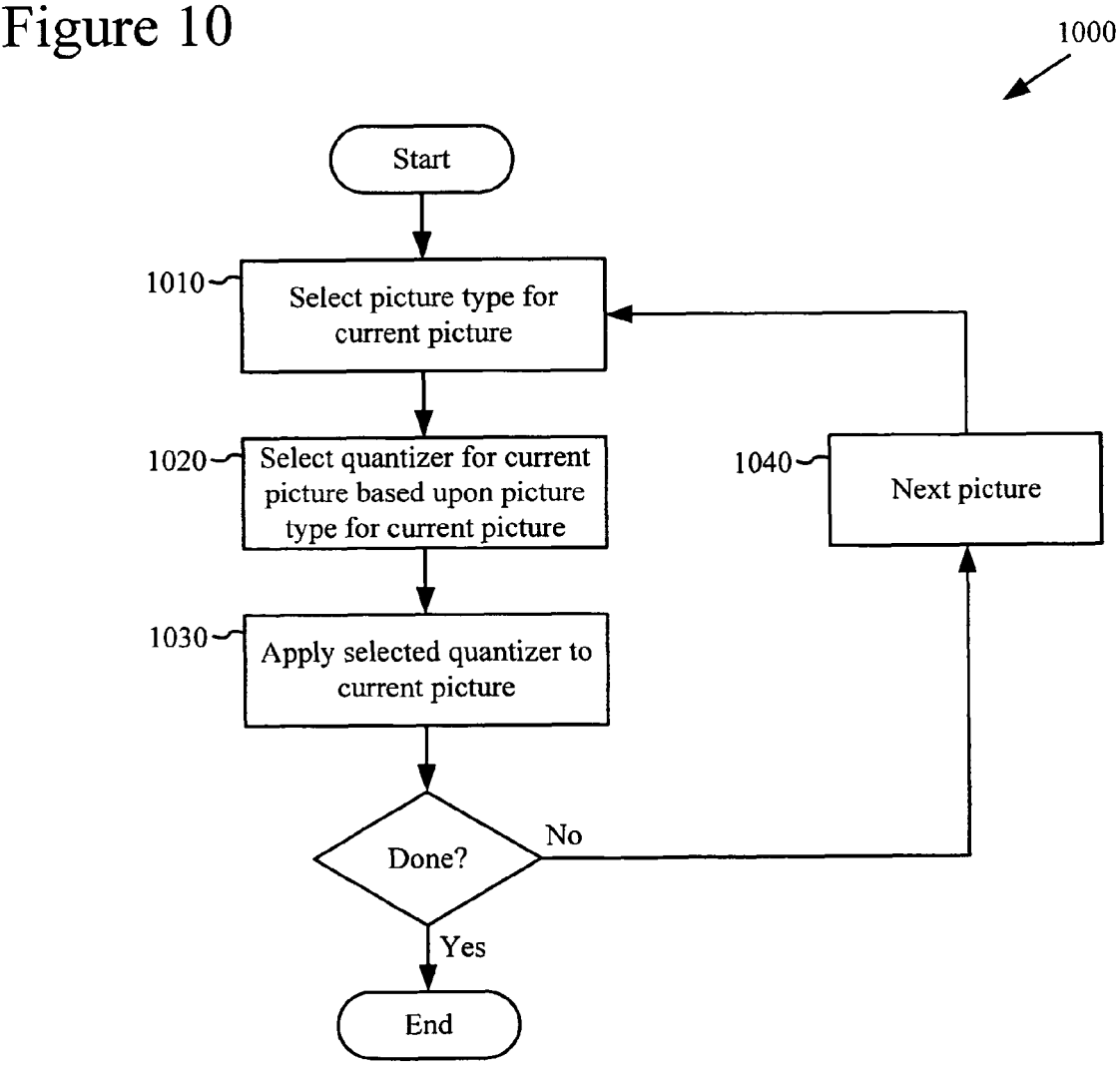
FIG. 10 is a flow chart showing a generalized technique for switching between multiple available quantizers based on picture type.

FIG. 10 is a flow chart showing a technique 1000 for switching quantizers based on picture type. An encoder such as the encoder 800 shown in FIG. 8 or other tool performs the technique 1000.

At 1010, an encoder selects a picture type for a current picture. The encoder can use various criteria for selecting picture types, although the encoder may have to follow certain rules for selecting picture types in order to be compliant with a decoder (e.g., encoding a picture as an I-picture at required intervals, etc.). In this example, the encoder encodes pictures as I-pictures, P-pictures or B-pictures.

At 1020, the encoder selects a quantizer for the current picture based at least in part upon the selected picture type. For example, the encoder selects a quantizer having a larger dead zone for a B-picture. The encoder can switch between a uniform quantizer and non-uniform quantizer, or can switch between other and/or additional available quantizers having different dead zone ratios. The encoder can consider additional criteria such as region smoothness, picture complexity and/or rate constraints when selecting a quantizer.

At 1030, the encoder applies the selected quantizer to the current picture. The encoder performs quantization for the current picture using the selected quantizer and one or more quantization step sizes selected for the picture. In this way, for a B-picture, the encoder can save bits for the current picture relative to other picture types, without increasing quantization step sizes relative to other picture types. The encoder can then similarly process other pictures (1040).

Using a larger dead zone for B-pictures can save bits more efficiently than simply raising the quantization step size. In some cases, the dead zone that is increased applies only to AC coefficients; the dead zone for DC coefficients remains the same. For example, for AC coefficients, the dead zone is 1.6*QP; for DC coefficients, the dead zone is fixed at 1.0*QP (0.5*QP on each side of zero). Since the increase in dead zone size only affects AC coefficients, the quality of smooth regions is often better preserved since DC coefficients are no more likely to be "zeroed-out" than when using quantizers with smaller dead zones. Since humans are perceptually sensitive to quality degradation in smooth regions, visual quality in video with prominent smooth regions can be improved.

Figure 11:
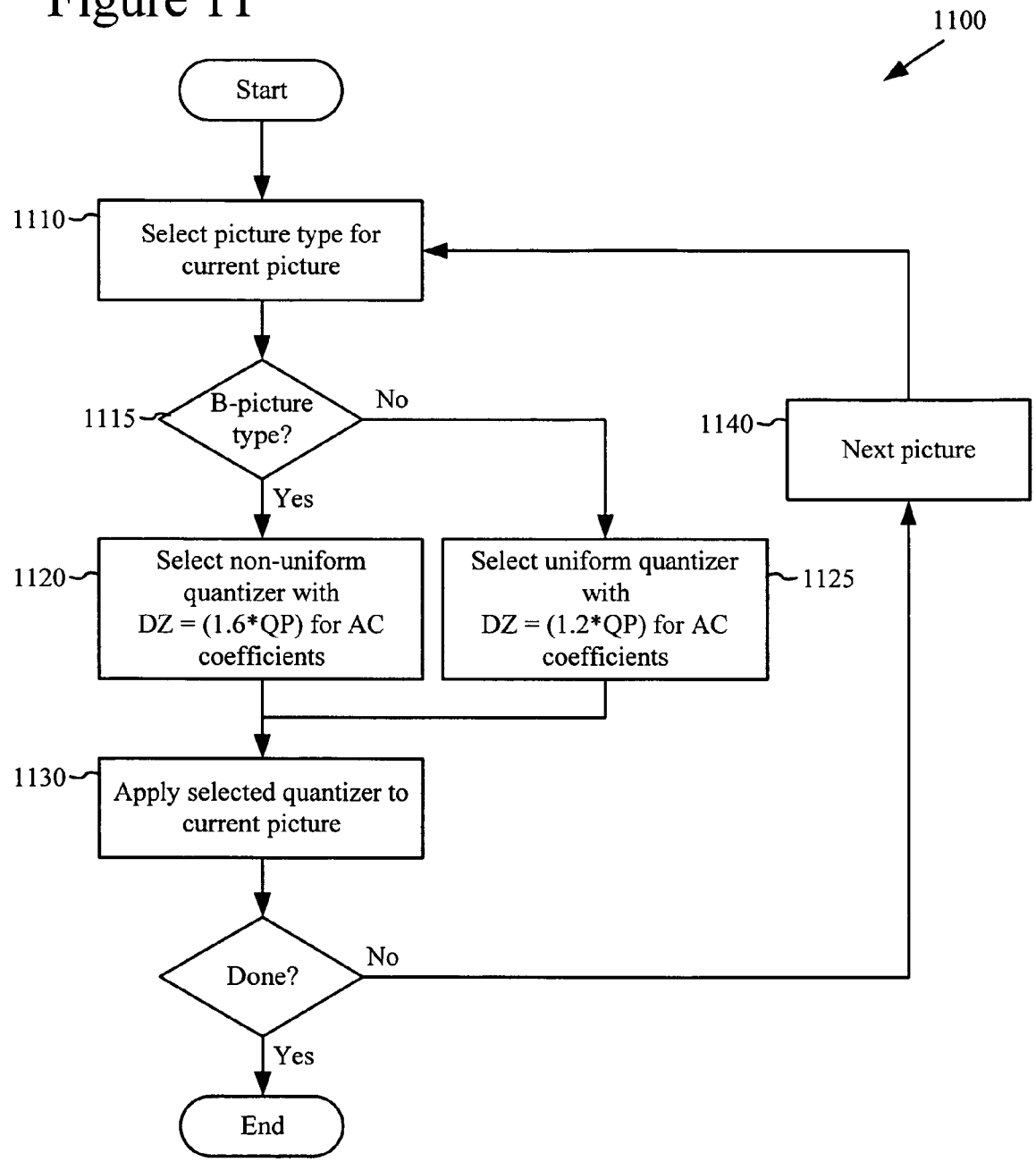
FIG. 11 is a flow chart showing a technique for selecting a quantizer with a larger dead zone ratio for AC coefficients in B-pictures.

FIG. 11 is a flow chart showing a technique 1100 for selecting a quantizer with a larger dead zone for AC coefficients in B-pictures relative to dead zones for other quantizers. An encoder such as the encoder 800 shown in FIG. 8 or other tool performs the technique 1100.

At 1110, an encoder selects a picture type for a current picture, for example, as described with reference to FIG. 10.

At 1115, the encoder determines whether or not the current picture is a B-picture. At 1120, if the current picture is a B-picture, the encoder selects a non-uniform quantizer for the current B-picture, where the dead zone for AC coefficients at each QP is equal to 1.6*QP. At 1125, if the current picture is not a B-picture, the encoder selects a uniform quantizer for the current picture, where the dead zone for AC coefficients at each QP is equal to 1.2*QP. With the non-uniform quantizer, the dead zone for AC coefficients is greater than those used for other picture types, but the dead zone for DC coefficients remains the same.

At 1130, the encoder applies the selected quantizer to the current picture, for example, as described with reference to FIG. 10. The encoder can then process other pictures in the sequence (1140).

Alternatively, an encoder performs adaptive B-picture quantization in other ways. For example, dead zones can be increased for both AC coefficients and DC coefficients. Dead zone ratios can be larger or smaller for different ranges of QPs. The size of dead zones can be larger or smaller relative to QP size. Dead zones can be calculated not as a function of specific QPs, but in some other way.

Example Implementation

In one implementation, an encoder uses an explicit quantization signaling mode. The signaling in the bitstream is different for B-pictures and I-pictures and P-pictures.

First, the encoder signals a 2-bit Quantizer Specifier (QUANTIZER) in a sequence header. QUANTIZER indicates the quantizer used for the sequence. The quantizer types are represented according to Table 3 below. To use an explicit signaling mode, the encoder sets QUANTIZER to 1.

TABLE 3

| Signaling quantizer type | |
|---|---|
| Value | Meaning |
| 0 | Quantizer implicitly specified at frame level |
| 1 | Quantizer explicitly specified at frame level |
| 2 | Non-uniform quantizer used for all frames |
| 3 | Uniform quantizer used for all frames |

In each frame header, the encoder specifically signals whether uniform or non-uniform quantization is used with bitstream element PQUANTIZER. If PQUANTIZER=0, the non-uniform quantizer is used for the frame. If PQUANTIZER=1, the uniform quantizer is used. In this implementation, for B-pictures, the encoder always signals PQUANTIZER=1 because the encoder always uses a non-uniform quantizer in order to increase the dead zone size. For other picture types, the encoder signals PQUANTIZER=0. Or, the encoder switches between PQUANTIZER=0 and PQUANTIZER=1 for other picture types, depending on selection criteria such as region smoothness, picture complexity, or rate constraints.

In explicit mode, whether PQUANTIZER=0 or PQUANTIZER=1, the quantization step size parameter (PQUANT) for a frame is the same value as the frame quantizer index (PQINDEX) for the frame. (The quantization step size can be further varied within a frame for different macroblocks or areas of the frame.)

Using a non-uniform quantizer for B-pictures is more efficient than other quantization settings in many scenarios. In testing, example video sequences were encoded using a non-uniform quantizer for B-pictures, with explicit quantizer signaling. The results were compared to an implicit quantization mode (see Table 2, above) where B-picture dead zones were selected and signaled using the same mechanisms as for I-pictures and P-pictures. For the I-pictures and P-pictures in the testing, PQUANT values and quantizers from the implicit quantization mode were re-used but explicitly signaled. The tests showed noticeable improvement for explicit signaling (and increased B-picture dead zones) over implicit quantization.

Alternatively, an encoder signals encoder decisions in some other way. For example, quantization decisions indicated above as being signaled at a particular syntax level can instead be signaled at some other level. Or, other codes or coding techniques (e.g., fixed-length coding, variable length coding, etc.) can be used.

Having described and illustrated the principles of our invention with reference to described embodiments, it will be recognized that the described embodiments can be modified in arrangement and detail without departing from such principles. It should be understood that the programs, processes, or methods described herein are not related or limited to any particular type of computing environment, unless indicated otherwise. Various types of general purpose or specialized computing environments may be used with or perform operations in accordance with the teachings described herein. Elements of the described embodiments shown in software may be implemented in hardware and vice versa.

In view of the many possible embodiments to which the principles of our invention may be applied, we claim as our invention all such embodiments as may come within the scope and spirit of the following claims and equivalents thereto.

We claim:

1. In a video encoder, a method comprising:
   selecting a picture type for a current picture;
   using the selected picture type when selecting between multiple available quantizers for the current picture, each of the multiple available quantizers having a different dead zone ratio, the selected quantizer for the current picture having a larger dead zone ratio, when the selected picture type is a B-picture type, than one or more other quantizers among the multiple available quantizers, wherein a larger dead zone ratio results in larger dead zone regions that each have a size that is a function of a quantization step size (OP) and wherein the size is approximately 0.8* QP on each side of zero for each OP of the selected quantizer;
   applying the selected quantizer to the current picture; and
   outputting encoded data for the current picture.

2. The method of claim 1 wherein the selected quantizer is a non-uniform quantizer.

3. The method of claim 1 wherein the larger dead zone ratio of the selected quantizer for the current picture applies for AC coefficients but not for DC coefficients.

4. The method of claim 1, wherein the larger dead zone regions are for AC coefficients and the size is approximately 0.8*QP on each side of zero for each QP of the selected quantizer, and wherein dead zone regions for DC coefficients have a size that is equal to 0.5*QP on each side of zero for each QP of the quantizer.

5. One or more computer-readable media having stored thereon computer executable instructions to cause a computer to perform the method of claim 1.

6. In a video encoder, a method comprising:
   getting a current picture of a video sequence;
   if the current picture is a P-picture or an I-picture:
      selecting a uniform quantizer with uniform dead zone for AC coefficients for the current picture; and
      applying the selected uniform quantizer to the current picture;
   if the current picture is a B-picture:
      selecting a non-uniform quantizer with a non-uniform dead zone for AC coefficients for the current picture, wherein the non-uniform dead zone is larger than the uniform dead zone of the uniform quantizers; and
      applying the selected non-uniform quantizer to the current picture; and
      outputting encoded data for the current picture.

7. The method of claim 6 wherein the non-uniform dead zone for AC coefficients for the current picture is greater than a dead zone for DC coefficients for the current picture.

8. The method of claim 6 wherein dead zone regions each have a size that is a function of the quantization step size (QP), and the non-uniform dead zone is approximately 0.8*QP on each side of zero for each QP of the non-uniform quantizer.

9. One or more computer-readable media having stored thereon computer executable instructions to cause a computer to perform the method of claim 6.

10. An encoder comprising:
    a frequency transformer for frequency transforming plural blocks of spatial domain information into plural blocks of transform coefficients;
    a quantizer for quantizing the transform coefficients;
    an entropy encoder for entropy encoding the quantized transform coefficients;
    an inverse quantizer for inverse quantizing the quantized transform coefficients; and
    a controller for selecting quantizers and quantization step sizes for the quantizing by choosing between plural available quantizers, each of the plural available quantizers having a different dead zone ratio, wherein the controller implements:
    a first path for increasing dead zone ratio while decreasing quantization step size for a given level of rate-distortion performance;
    a second path for decreasing dead zone ratio while increasing quantization step size for the given level of rate-distortion performance; and
    wherein the controller follows the first path if a current picture is a B-picture type and otherwise follows the second path.

11. The encoder of claim 10 wherein the selecting comprises using picture type when choosing between the plural available quantizers and when selecting between different quantization step sizes.

12. The encoder of claim 10 further comprising:
    a motion estimator for estimating motion in predicted pictures from reference pictures;
    a motion compensator for applying the estimated motion; and
    one or more reference picture buffers for storing the reference pictures.

13. The encoder of claim 10 wherein the plural available quantizers include a uniform quantizer and a non-uniform quantizer.

14. The encoder of claim 13 wherein the non-uniform quantizer has a larger dead zone ratio than the uniform quantizer.

15. The encoder of claim 13 wherein the non-uniform quantizer has a non-uniform dead zone for quantizing AC coefficients and a uniform dead zone for quantizing DC coefficients.

16. The encoder of claim 10 wherein selecting quantizers comprises, for a current picture, selecting a first quantizer from among the plural available quantizers if the current picture has a B-picture type and otherwise selecting a second quantizer from among the plural available quantizers.

* * * * *

UNITED STATES PATENT AND TRADEMARK OFFICE
CERTIFICATE OF CORRECTION

PATENT NO. : 7,974,340 B2
APPLICATION NO. : 11/400744
DATED : July 5, 2011
INVENTOR(S) : Minghui Xia et al.

It is certified that error appears in the above-identified patent and that said Letters Patent is hereby corrected as shown below:

In the Claims:

In column 17, line 52, in Claim 1, delete "(OP)" and insert -- (QP) --, therefor.

In column 17, line 54, in Claim 1, delete "OP" and insert -- (QP) --, therefor.

Signed and Sealed this
Twenty-third Day of August, 2011

David J. Kappos
*Director of the United States Patent and Trademark Office*